United States Patent
Woo et al.

(10) Patent No.: US 9,952,766 B2
(45) Date of Patent: Apr. 24, 2018

(54) MEMORY SYSTEM, INCLUDING MEMORY DEVICE CAPABLE OF OVERWRITE OPERATION, AND METHOD OF OPERATING THE MEMORY SYSTEM

(71) Applicants: Yeong-Jae Woo, Suwon-si (KR); Kyoung-Il Bang, Suwon-si (KR); Sung-Yong Seo, Seongnam-si (KR); Eun-Chu Oh, Hwaseong-si (KR); Moon-Sang Kwon, Seoul (KR); Han-Shin Shin, Yongin-si (KR)

(72) Inventors: Yeong-Jae Woo, Suwon-si (KR); Kyoung-Il Bang, Suwon-si (KR); Sung-Yong Seo, Seongnam-si (KR); Eun-Chu Oh, Hwaseong-si (KR); Moon-Sang Kwon, Seoul (KR); Han-Shin Shin, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 165 days.

(21) Appl. No.: 14/994,172

(22) Filed: Jan. 13, 2016

(65) Prior Publication Data

US 2016/0224247 A1  Aug. 4, 2016

(30) Foreign Application Priority Data

Feb. 2, 2015 (KR) ........................ 10-2015-0016185

(51) Int. Cl.
*G06F 3/06* (2006.01)
*G06F 12/02* (2006.01)

(52) U.S. Cl.
CPC ............ *G06F 3/0604* (2013.01); *G06F 3/064* (2013.01); *G06F 3/068* (2013.01); *G06F 3/0653* (2013.01);

(Continued)

(58) Field of Classification Search
CPC ................. G06F 3/064; G06F 3/0604; G06F 2212/7201; G06F 12/0246; G06F 3/068
See application file for complete search history.

(56) References Cited

U.S. PATENT DOCUMENTS 6,122,708 A * 9/2000 Faraboschi ......... G06F 12/0848
711/118
7,325,090 B2  1/2008 Ronen
(Continued)

FOREIGN PATENT DOCUMENTS

KR  1020100099888 A  9/2010

*Primary Examiner* — Prasith Thammavong
*Assistant Examiner* — Edmund H Kwong
(74) *Attorney, Agent, or Firm* — Volentine & Whitt, PLLC

(57) ABSTRACT

A memory device capable of performing an overwrite operation, a memory system, and a method of operating the memory system are provided. The method includes receiving one or more write requests, a logical address and data corresponding to the one or more write requests; comparing a result of analyzing at least one of the received one or more write requests, logical address, and data with a threshold value; and writing data using a first update method or a second update method, based on a result of the comparison. When the first update method is selected, the data are written in a region indicated by a physical address corresponding to the logical address according to address mapping information. When the second update method is selected, information of the physical address corresponding to the logical address is changed, and the data are written in a region indicated by the changed physical address.

17 Claims, 34 Drawing Sheets

(52) U.S. Cl.
CPC ........ *G06F 3/0665* (2013.01); *G06F 12/0246* (2013.01); *G06F 2212/7201* (2013.01); *G06F 2212/7204* (2013.01)

(56) References Cited

U.S. PATENT DOCUMENTS

| | | |
|---|---|---|
| 7,418,544 B2 | 8/2008 | Mukherjee et al. |
| 8,117,406 B2 | 2/2012 | Whang et al. |
| 8,261,010 B2 | 9/2012 | Eom et al. |
| 8,364,918 B1* | 1/2013 | Smith ................ G06F 12/0246 711/159 |
| 8,402,202 B2 | 3/2013 | Park et al. |
| 8,417,872 B2 | 4/2013 | Bae et al. |
| 8,677,058 B2 | 3/2014 | Jung et al. |
| 2009/0282301 A1* | 11/2009 | Flynn .................... G06F 11/006 714/710 |
| 2010/0023676 A1 | 1/2010 | Moon et al. |
| 2012/0033482 A1* | 2/2012 | Chen ...................... G11C 11/16 365/148 |
| 2013/0073784 A1* | 3/2013 | Ng ..................... G06F 12/0246 711/103 |
| 2014/0016397 A1 | 1/2014 | Lee et al. |
| 2014/0082031 A1 | 3/2014 | Chun |

\* cited by examiner

MEMORY SYSTEM, INCLUDING MEMORY DEVICE CAPABLE OF OVERWRITE OPERATION, AND METHOD OF OPERATING THE MEMORY SYSTEM

CROSS-REFERENCE TO RELATED APPLICATION

A claim for priority under 35 U.S.C. § 119 is made to Korean Patent Application No. 10-2015-0016185, filed on Feb. 2, 2015, in the Korean Intellectual Property Office, the entire contents of which are hereby incorporated by reference.

BACKGROUND

The inventive concept relates to a semiconductor device, and more particularly to, a memory device capable of an overwrite operation, a memory system, and a method of operating the memory system.

With increasing demand for memory devices with a high capacity and low power consumption, research is being conducted into next-generation memory devices that are non-volatile and simultaneously need no refresh. Next-generation memory devices are required to have a high integrity characteristic of dynamic random access memory (DRAM), non-volatile characteristic of a flash memory, and a high speed characteristic of static RAM (SRAM). As the next-generation memory devices that meet the above-described requirements, phase change RAM (PRAM), nano floating gate memory (NFGM), polymer RAM (PoRAM), magnetic RAM (MRAM), ferroelectric RAM (FeRAM), and resistive RAM (RRAM) are highlighted.

SUMMARY

According to an aspect of the inventive concept, there is provided a method of operating a memory system. The method includes receiving one or more write requests, a logical address and data corresponding to the one or more write requests; comparing a result of analyzing at least one of the received one or more write requests, logical address, and data with a threshold value; and writing data using a first update method or a second update method, based on a result of the comparison. When the first update method is selected, the data are written in a region indicated by a physical address corresponding to the logical address according to address mapping information. When the second update method is selected, information of the physical address corresponding to the logical address is changed, and the data are written in a region indicated by the changed physical address.

According to another aspect of the inventive concept, there is provided a method of operating a memory system including a plurality of memory chips. The method includes receiving a write request with corresponding data and first information from a host; selecting an update method in response to the write request based on at least one of the first information received from the host and second information included in the memory system; and writing the received data in one of the plurality of memory chips or distributing and writing the data in at least two of the plurality of memory chips.

According to another aspect of the inventive concept, there is provided a method of operating a memory system including a memory cell array. The method includes receiving a write request, a first logical address, and write data; receiving and detecting update information; and writing the write data in a first region of the memory cell array corresponding to the first logical address according to previously stored address mapping information or in a second region of a location different from that of the first region, according to a result of detecting the update information.

According to another aspect of the inventive concept, there is provided a memory system including a memory controller configured to control a memory operation. The memory controller includes a working memory, an update management unit, and a memory interface. The working memory is loaded with address mapping information for converting a logical address to a physical address. The update management unit is configured to select an update method corresponding to a write request received from outside based on a comparison of a result of analyzing at least one of the write request, the logical address, and data with a threshold value. The memory interface is configured to output a first physical address corresponding to the logical address according to previously stored address information or a second physical address corresponding to the logical address according to changed address mapping information according to a result of selecting the update method.

According to another aspect of the inventive concept, there is provided a memory system including a memory device and a memory controller. The memory device includes a memory cell array comprising a plurality of blocks and configured to store write data in one of a first region of the plurality of blocks corresponding to a logical address according to previously stored address mapping information, or a second region of the plurality of blocks different from the first region. The memory controller includes a processing unit, a host interface, an update management unit, and a memory interface. The processing unit is configured to control overall operations of the memory controller. The host interface is configured to receive a write request, the write data and the logical address from a host. The update management unit is configured to select one of an in-place update operation or an out-of-place update operation in response to the write request from the host, where the in-place update operation includes overwriting data in the first region of the memory cell array with the write data, and the out-of-place update operation includes writing at least a part of the write data in the second region of the memory cell array based on a comparison of a result of analyzing at least one of the write request, the logical address, and data with a threshold value. The memory interface is configured to output a first physical address to the memory device corresponding to the logical address when the in-place update operation is selected, the first physical address being in the first region, and to output a second physical address corresponding to the logical address when the out-of-place update operation is selected, at least a part of the second physical address being in the second region according to changed address mapping information.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
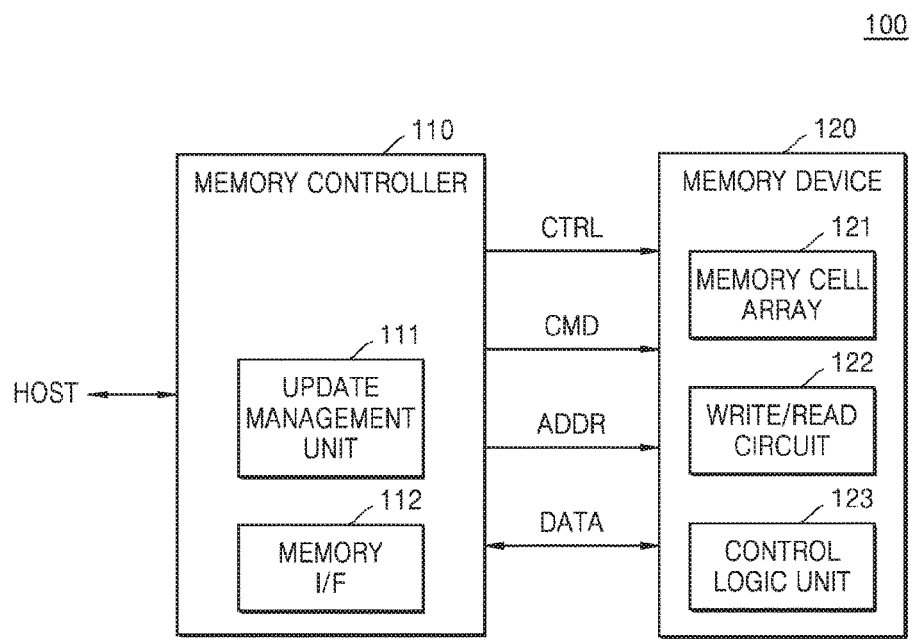
FIG. 1 is a block diagram of a memory system, according to an exemplary embodiment.

Embodiments will be described in detail with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to one of ordinary skill in the art. Accordingly, known processes, elements, and techniques are not described with respect to some of the embodiments. Unless otherwise noted, like reference numerals denote like elements throughout the attached drawings and written description, and thus descriptions may not be repeated. In the drawings, sizes and relative sizes of layers and regions may be exaggerated for clarity.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that although the terms "first", "second", etc. may be used herein to describe various components, these components should not be limited by these terms. These components are only used to distinguish one component from another. For example, a first component may be referred to as a second component, and similarly, a second component may be referred to as a first component.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having meanings consistent with meanings in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list. The term "exemplary" is intended to refer to an example or illustration.

FIG. 1 is a block diagram of a memory system 100 according to an exemplary embodiment. The memory system 100 includes a memory device 120 and a memory controller 110. In the present exemplary embodiment, the memory device 120 includes resistive memory cells and thus may be referred to as a resistive memory device. Alternatively, the memory device 120 may include various types of memory cells that are disposed in regions where a plurality of first signal lines and a plurality of second signal lines cross each other, and thus the memory device 120 may be referred to as a cross point memory device. In describing the exemplary embodiment below, it is assumed that the memory device 120 is a resistive memory device.

Referring to FIG. 1, the memory system 100 includes the memory controller 110 and the memory device 120. The memory device 120 includes a memory cell array 121, a write/read circuit 122, and a control logic unit 123. When the memory cell array 121 includes resistive memory cells, the memory system 100 may be referred to as a resistive memory system.

In response to a write/read request from a host, the memory controller 110 may control the memory device 120 to read or write data stored in the memory device 120 from or to the memory device 120. More particularly, the memory controller 110 may provide the memory device 120 with an address ADDR, a command CMD, and a control signal CTRL and thus may control a programming (or write) operation, a read operation, and an erase operation on the memory device 120. Data DATA that is to be written to or read from the memory device 120 is transmitted/received between the memory controller 110 and the memory device 120.

The memory cell array 121 may include a plurality of memory cells (not shown) that are disposed respectively in regions where a plurality of first signal lines and a plurality of second signal lines cross each other. According to an exemplary embodiment, the first signal lines may be bit lines, and the second signal lines may be word lines. According to another exemplary embodiment, the first signal lines may be word lines, and the second signal lines may be bit lines.

Each of the memory cells may be a single-level cell (SLC) that may store 1 bit or a multi-level cell (MLC) that may store at least 2 bits. Alternatively, the memory cell array 121 may include SLCs and MLCs. When 1-bit data are written in one memory cell, the memory cells have two resistance level distributions in accordance with stored data. Alternatively, when 2-bit data are written in one memory cell, the memory cells have four resistance level distributions in accordance with stored data. According to another exemplary embodiment, when each of the memory cells is a triple-level cell (TLC) that may store 3 bits in one memory cell, the memory cells have eight resistance level distributions in accordance with stored data. However, the inventive concept is not limited thereto. According to other exemplary embodiments, each of the memory cells may store 4- or more bit data without departing from the scope of the present teachings.

The memory cell array 121 may include resistive memory cells including a variable resistor device (not shown). For example, when resistance of the variable resistor device that is formed of a phase change material (e.g., Ge—Sb—Te) is changed according to temperature, the memory device 120 may be a phase change RAM (PRAM). As another example, when the variable resistor device is formed of an upper electrode, a lower electrode, and a transition metal oxide (complex metal oxide) therebetween, the memory device 120 may be a resistive RAM (ReRAM). As another example, when the variable resistor device is formed of an upper electrode of a magnetic material, a lower electrode of a magnetic material, and a dielectric therebetween, the memory device 120 may be a magnetic RAM (MRAM).

The write/read circuit 122 performs write and read operations on the memory cells. The write/read circuit 122 may be connected to the memory cells through a plurality of bit lines and may include a write driver for writing data to the memory cells and a sense amplifier for sensing resistance components of the memory cells.

The control logic unit 123 may control overall operations in the memory device 120, and may control the write/read circuit 122 to perform a memory operation such as the write and read operations. For example, the memory device 120 may include a power generator (not shown) for generating various write and read voltages used in the write and read operations so that the control logic unit 123 may control levels of the write and read voltages. As another example, the memory device 120 may include a reference signal generator (not shown) for generating various reference signals used in the read operation. For example, the reference signal generator may generate a reference current and/or a reference voltage.

In a write operation performed in the memory device 120, variable values of variable resistances of the memory cells of the memory cell array 121 may increase or decrease according to write data. For example, each of the memory cells of the memory cell array 121 may have a resistance value according to currently stored data, and the resistance value may increase or decrease according to data that is to be written in each of the memory cells. The write operation may be classified as a reset write operation and a set write operation. A set state of a resistive memory cell may have a relatively low resistance value, whereas a reset state thereof may have a relatively high resistance value.

According to an exemplary embodiment, since the memory cell array 121 includes the resistive memory cells, data may be overwritten in the memory cells during the write operation performed on the memory cell array 121. A data overwrite operation may be defined as an operation of directly programming data in memory cells of a write target without a separate erasure operation (e.g., corresponding to the reset write operation in a resistive memory) being performed on the memory cells to which the data are to be written. That is, the write operation may be performed by moving a resistance state according to existing data to a resistance state corresponding to data that is currently requested to be written, without generating a free block by erasing data of the memory cells and having to actually write the data to the free block.

According to an exemplary embodiment, the memory system 100 may perform the write operation by selectively applying an in-place update operation (first update method) and/or an out-of-place update operation (second update method) in response to a write request from a host HOST. The in-place update operation may be performed based on the above-described overwrite operation, for example, by overwriting the data to a region indicated by the host HOST. The out-of-place update operation may be performed by not overwriting the data to the region indicated by the host HOST, but by writing the data in another region of the memory cell array 121.

When the out-of-place update operation is selected, write data may be written in a different region from a region requested by the host HOST (a region corresponding to a logical address provided by the host HOST). For example, the logical address provided from the host HOST may include information indicating one or more pages, and the write data may be written in another page that is not indicated to be written to by the host HOST according to the out-of-place update operation. As an example, the write data may be written in a free block having an erasure state (or the reset state).

As another example, when the data are written using an out-of-place update, the write data may be overwritten in a region that is different from the region requested by the host HOST. For example, when the data are written in the region that is different from the region requested by the host HOST while the data are invalid data, the write data from the host HOST may be overwritten in the different region.

The memory system 100 may perform an analysis operation on at least one of various pieces of information provided from the host HOST and various pieces of information provided in the memory system 100 in response to the write request from the host HOST and may select whether to write the data using the in-place update or the out-of-place update in response to the write request based on an analysis result.

To this end, the memory controller 110 may include an update management unit 111 and the memory interface 112. The update management unit 111 may determine an update method that is to be performed in response to the write request from the host HOST with reference to at least one of various pieces of information provided from the host HOST and various pieces of information provided in the memory system 100. According to a result of determining the update method, at least one of the command CMD and the address ADDR provided from the memory controller 110 to the memory device 120 may be changed, and the memory interface 112 may provide the memory device 120 with the command CMD and the address ADDR using the determined update.

When the data are written using the in-place update in response to the write request, since the data are updated in a location indicated by the host HOST, operations such as a garbage collection operation, a metadata write operation, and the like, do not occur, and thus response may be improved and the possibility of lifespan reduction of the memory system 100 may be reduced. When the data are written using the out-of-place update in response to the write request, and when multiple memory chips are provided in the memory system 100, write speed with respect to a large amount of data may increase by utilizing parallelism, since the write data may be simultaneously written in the multiple memory chips using the out-of-place update.

According to an exemplary embodiment, the in-place update or the out-of-place update is selectively applied in consideration of lifespan and performance of the memory system 100, thereby improving the lifespan and performance of the memory system 100.

The memory controller 110 and the memory device 120 may be integrated into one semiconductor device. For example, the memory controller 110 and the memory device 120 may be integrated into one semiconductor device to configure a memory card. Likewise, for example, the memory controller 110 and the memory device 120 may be integrated into one semiconductor device to configure a PC card (PCMCIA), a compact flash card (CF), a smart media card (SM/SMC), a memory stick, a multimedia card (MMC, RS-MMC, and MMCmicro), an SD card (SD, miniSD, and microSD), a universal flash storage (UFS), and the like. For another example, the memory controller 110 and the memory device 120 may be integrated into one semiconductor device to configure a solid state disk/drive (SSD).

Figure 2:
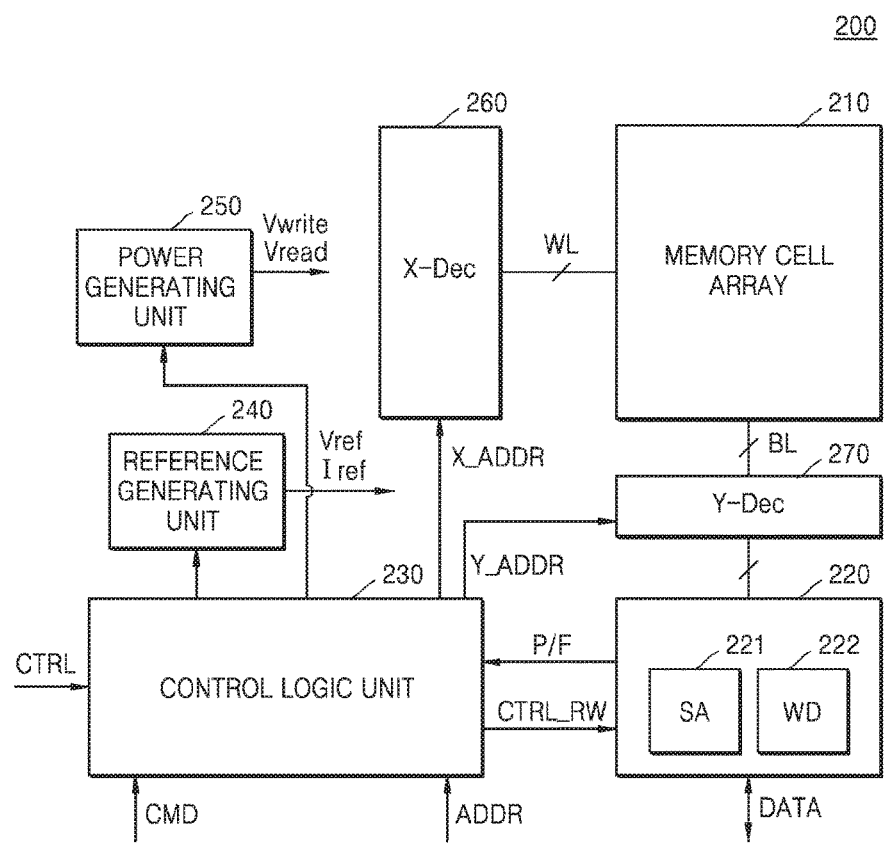
FIG. 2 is a block diagram illustrating a memory device, according to an exemplary embodiment.

An example of a detailed operation of the memory system 100 that may be configured as described above is described below. FIG. 2 is a block diagram illustrating a memory device 200, according to an exemplary embodiment.

Referring to FIG. 2, the memory device 200 included a memory cell array 210, a write/read circuit 220, and a control logic unit 230. The memory device 200 further includes a reference generating unit 240, a power generating unit 250, a row decoder 260, and a column decoder 270. The write/read circuit 220 includes a sense amplifier 221 and a write driver 222.

An example of an operation of the memory device 200 of FIG. 2 is described below.

Memory cells included in the memory cell array 210 may be connected to a plurality of first signal lines and a plurality of second signal lines. The first signal lines may be bit lines BL, and the second signal lines may be word lines WL. Since various voltage signals or current signals are provided through the bit lines BL and the word lines WL, data may be written in or read from selected memory cells, and the data may be prevented from being written in or read from non-selected memory cells.

The command CMD may be received accompanied by an address ADDR to identify a memory cell that is to be accessed. The address ADDR may include a row address X_ADDR for selecting the word lines WL of the memory cell array 210 and a column address Y_ADDR for selecting the bit lines BL thereof. The address ADDR provided to the memory device 200 may correspond to a physical address PA converted in a memory system in correspondence to a logical address LA from a host. The row decoder 260 may perform a word line selection operation in response to the row address X_ADDR. The column decoder 270 may perform a bit line selection operation in response to the column address Y_ADDR.

The write/read circuit 220 may be connected to the first signal lines and/or the second signal lines of the memory cell array 210 to write or read data to or from a memory cell (e.g., the write/read circuit 220 is connected to the bit lines BL in FIG. 2). According to an exemplary embodiment, the power generating unit 250 may generate a write voltage Vwrite used in a write operation and a read voltage Vread used in a read operation. The write voltage Vwrite may include a set voltage and a reset voltage as various voltages related to the write operation. The write voltage Vwrite and the read voltage Vread may be provided to the bit lines BL through the column decoder 270 and/or the word lines WL through the row decoder 260.

The reference signal generating unit 240 may generate a reference voltage Vref and a reference current Iref as various reference signals related to a data read operation. For example, the sense amplifier 221 may be connected to a node (for example, a sensing node) of the bit line BL to determine data. A data value may be determined through an operation of comparing a voltage of the sensing node and the reference voltage Vref. Alternatively, when a current sensing method is applied, the reference signal generating unit 250 may generate and provide the reference current Iref to the memory cell array 210. The data value may be determined through an operation of comparing a voltage of the sensing node caused by the reference current Iref and the reference voltage Vref.

The write/read circuit 220 may provide a pass/fail signal P/F as a result of determining the read data to the control logic unit 230. The control logic 230 may control write and read operations of the memory cell array 210 by referring to the pass/fail signal P/F.

The control logic unit 230 may output various controls signals CTRL_RW for writing or reading the data to or from the memory cell array 210 based on the command CMD, the address ADDR, and the control signal CTRL that are received from a memory controller (not shown). Thus, the control logic unit 230 may generally control various operations performed in the memory device 200.

According to an exemplary embodiment, the data DATA may be written in the memory cell array 210 using an in-place update or an out-of-place update. The address ADDR from the memory controller may include information indicating a physical location of the memory cell array 210 to which the data Data are to be written. When the in-place update is applied, the data DATA may be updated in a physical location corresponding to a logical address from the host (not shown). When the out-of-place update is applied, a physical address corresponding to the logical address received from the host (not shown) may be changed, and the data may be updated in a physical location corresponding to the changed physical address.

Meanwhile, when the out-of-place update is applied, along with an update operation of the data in correspondence to a write request of the host, an erasure operation may be further performed on a partial region of the memory cell array 210 to achieve a block in an erasure state in which the data are to be updated. The physical address corresponding to the logical address received from the host is changed, and thus a metadata write operation for updating mapping information of the logical address/physical address may be further performed.

Figure 3:
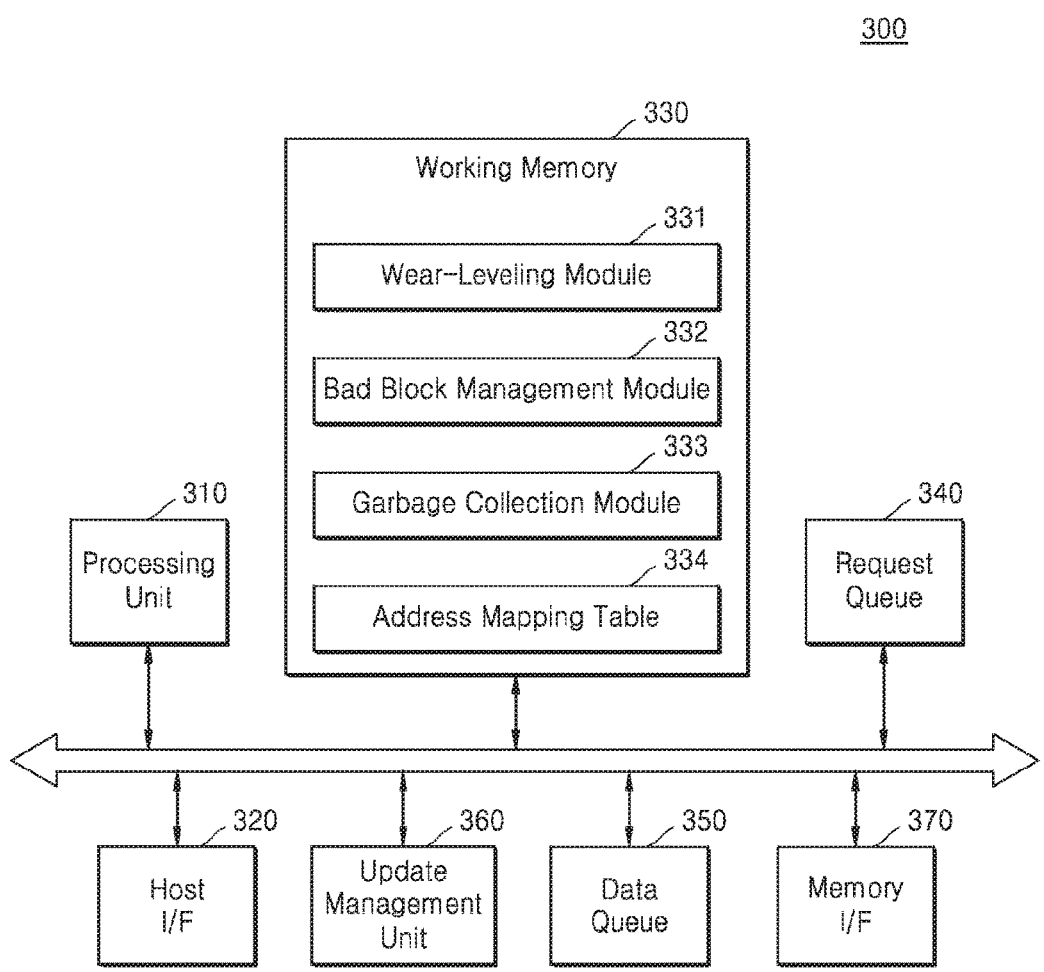
FIG. 3 is a block diagram illustrating an example of a memory controller of FIG. 1, according to an exemplary embodiment.

An example of a detailed operation of a memory controller according to an exemplary embodiment is described below. FIG. 3 is a block diagram illustrating an example of a memory controller 300, according to an exemplary embodiment of FIG. 1.

Referring to FIG. 3, the memory controller 300 includes a processing unit 310, a host interface 320, a working memory 330, a request queue 340, a data queue 350, an update management unit 360, and a memory interface 370. The working memory 330 includes a wear-leveling module 331, a bad block managing module 332, a garbage collection module 333, and an address mapping table 334. Although not shown in FIG. 3, the memory controller 300 may further include various elements, for example, read only memory (ROM) for storing a code data code necessary for initially booting a device employing a memory system or a buffer memory controller for controlling a buffer memory device. The memory controller 300 may further include a command generating module (not shown) for generating the command CMD used to control a memory operation according to a request from a host. For example, the command generating module (not shown) may be provided in the memory interface 370.

The processing unit 310 may include a central processing unit or a microprocessor, and may control overall operations of the memory controller 300. The processing unit 310 may be configured to drive firmware for controlling the memory controller 300. The firmware may be driven by being loaded in the working memory 330. The memory controller 300 may be configured to communicate with an external host through various standard interfaces. The host interface 320 provides an interface between the host and the memory controller 300. The standard interfaces may include an advanced technology attachment (ATA), a serial-ATA (SATA), an external SATA (e-SATA), a small computer system interface (SCSI), a serial attached SCSI (SAS), a peripheral component interconnection (PCI), a PCI express (PCI-E), IEEE 1394, a universal serial bus (USB), a secure digital (SD) card, a multi media card (MMC), an embedded multimedia card (eMMC), a universal flash storage (UFS), or a compact flash (CF) card interface, for example.

The memory interface 370 provides an interface between the memory controller 300 and a memory device. For example, write data and read data may be transmitted to and/or received from the memory device through the memory interface 370. The memory interface 370 may provide a command and an address to the memory device, receive various pieces of information from the memory device, and provide the various pieces of information to the memory controller 300.

The firmware for controlling the memory controller 300 and metadata necessary for driving the firmware may be stored in the working memory 330. The working memory 330 may be implemented as various memories, for example, at least one of cache memory, DRAM, SRAM, PRAM, and flash memory devices.

Various functional blocks may be configured using the firmware stored in the working memory 330. For example, the wear-leveling module 331, as a functional block included in the working memory 330, manages wear-levels of memory cells of the memory device. Resistive memory cells may age according to frequency of write and erasure operations. An aged memory cell (or a worn memory cell) may cause a defect. The wear-leveling module 331 manages the number of erasure and/or write operations performed in a predetermined region unit of a memory cell array, thereby preventing a specific region from wearing faster than another region. For example, the memory device may be written in page units and may be erased in block units, and wear-leveling may be managed in the page units or the block units. As an example, the wear-leveling module 331 may manage the address mapping table 334 such that an equalization write number is provided to regions of the memory cell array.

The bad block managing module 332 manages a block in which a defect occurs among multiple blocks provided in the memory device. For example, as described above, wear-levels of the resistive memory cells may increase due to increases the number write and erasure operations, and thus a block including memory cells in which the defect occurs may be processed as a bad block. The bad block managing module 332 may manage the address mapping table 334 such that the block processed as the bad block is prevented from having data written thereto.

The garbage collection module 333 may collect blocks in which fragmented data are stored. For example, when an erasure unit is set to be greater than a write unit in a resistive memory device, the garbage collection module 333 may perform the job of collecting continuous data scattered in physically different locations to the same address region using an arbitrary free block after repeating write and erasure operations.

When data are written using an out-of-place update according to an exemplary embodiment, the data with respect to a logical address of a host may be written in locations corresponding to multiple physical addresses. Data that is recently updated and written to a physical address may be valid data, whereas data written to another physical location may be invalid data. Assuming, for example, that the data are written in a free block in the out-of-place update, when valid data are stored in one block (for example, a first block) in which the data are to be written, the valid data are copied to another free block, the erasure operation is performed on the first block to generate a free block, and then the data are written in the first block corresponding to the free block. The garbage collection module 333 may manage operations of copying the data and generating the free block described above.

The address mapping table 334 may store address mapping information between a logical address LA of the host and a physical address indicating a physical location in which data are to be actually accessed in correspondence to the logical address. The logical address provided from the host may be converted into the physical address indicating the physical location of a memory cell that is to be actually accessed by referring to the address mapping information. According to an exemplary embodiment, the data may be updated by selecting the out-of-place update in response to a write request from the host. In this regard, the physical address corresponding to the logical address provided from the host may be changed. Changed information may be updated to the address mapping table 334.

In the address mapping table 334, the address mapping information may be changed according to a result of managing the above-described various functional blocks. For example, the data written in the memory cells having wear-levels that are increased or memory cells processed as bad blocks may be moved to normal memory cells, and thus address mapping information between the logical address and the physical address may be changed. After the data are moved according to the garbage collection operation, the address mapping information between the logical address and the physical address may be changed.

The address mapping information of the address mapping table 334 may be stored in a predetermined region (for example, a meta region) of the memory cell array 210 of FIG. 2, and the address mapping information stored in the memory cell array 210 may be loaded in the address mapping table 334 when the memory system is driven. When the address mapping information is changed according to the memory operation, the changed address mapping information may be arbitrarily or periodically updated in the predetermined region of the memory cell array 210.

The request queue 340 may store a request and an address received from the host. One or more requests provided from the host may be stored in the request queue 340. The request queue 340 may operate based on a first in first out (FIFO) method. Alternatively, priority information in response to each request may be provided, and may be monitored by a separate functional block (for example, an arbiter (not shown)) that may be provided in the memory system. A processing order of the requests may be determined according to a monitoring result. The data queue 350 may store data received in response to a write request.

The update management unit 360 may select an update method with respect to the write request from the host using one or more pieces of information from the host and/or one or more pieces of information from the memory system according to an exemplary embodiment. When the information of the host is used, the update management unit 360 may determine the number of write requests and an amount of data by referring to the request, data, and the address provided from the host (or requests, data, and addresses stored in the request queue 340 and the data queue 350), and may select the update method from a determination result. Alternatively, the update management unit 360 may select the update by referring to the address (for example, the logical address LA) from the host and the address mapping information of the memory system. Detailed examples of selecting the update are described below.

Figure 4A:
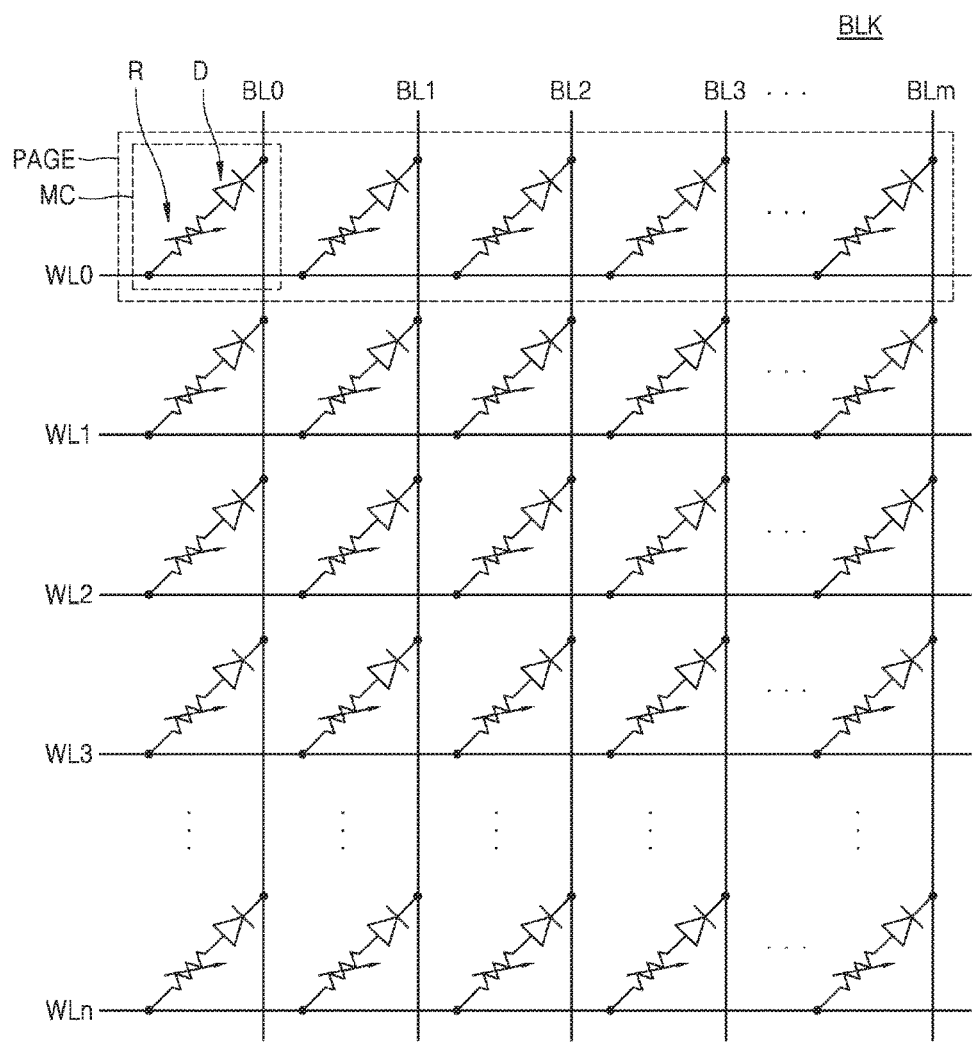
FIGS. 4A and 4B are a circuit diagram illustrating an example of a memory cell array and a graph illustrating an example of set/reset write operations on the memory cell array, respectively, according to an exemplary embodiment.
Figure 4B:
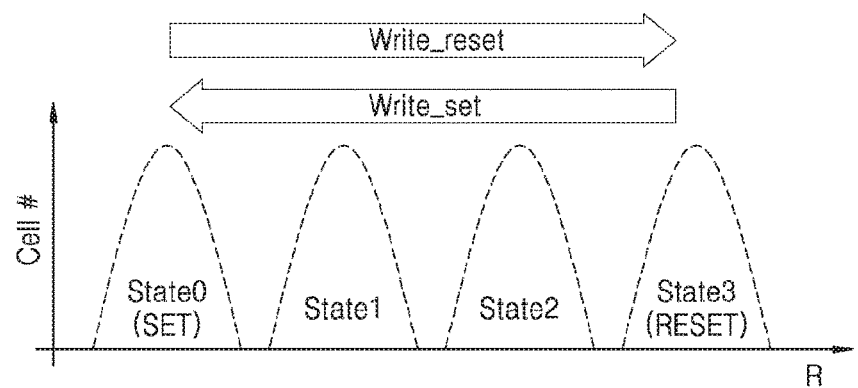

FIGS. 4A and 4B are a circuit diagram illustrating an example of the memory cell array 210 and a graph illustrating an example of set/reset write operations on the memory cell array 210, respectively, according to an exemplary embodiment.

The memory cell array 210 of FIG. 2 may include multiple memory cell regions. A memory cell region indicating a set of memory cells may be defined in various ways. For example, FIG. 4A illustrates memory cells provided in a region of block BLK units. The block BLK may include a multiple pages PAGE including memory cells MC connected to a same word line.

Referring to FIG. 4A, the block BLK includes a plurality of word lines WL0 through WLn, a plurality of bit lines BL0 through BLm, and a plurality of memory cells MC. In this regard, the number of word lines WL, bit lines BL, and memory cells MC may be changed in various ways according to exemplary embodiments.

Each of the memory cells MC includes a variable resistor R and a selection device D. In this regard, the variable resistor R may be referred to as a variable resistor device or a variable resistance material, and the selection device D may be referred to as a switching device.

In an exemplary embodiment, the selection device D may be connected between one of the bit lines BL0 through BLm and the variable resistor R, and the variable resistor R may be connected between the selection device D and one of the word lines WL0 through WLn. However, the exemplary embodiments of the inventive concept are not limited thereto, and the variable resistor R may be connected between one of the bit lines BL0 through BLm and the selection device D, and the selection device D may be connected between the variable resistor R and one of the word lines WL0 through WLn.

The variable resistor R may be changed as one of a plurality of resistance states by an applied electrical pulse. In an exemplary embodiment, the variable resistor R may include a phase change material whose crystal state is changed according to an amount of current. The phase change material may use various types of materials such as mixtures of two atoms GaSb, InSb, InSe, Sb2Te3, and GeTe, mixtures of three atoms GeSbTe, GaSeTe, InSbTe, SnSb2Te4, and InSbGe, and mixtures of four atoms AgInSbTe, (GeSn)SbTe, GeSb(SeTe), Te81Ge15Sb2S2, for example.

Such a phase change material may have an amorphous state in which resistance is relatively high and a crystal state in which resistance is relatively low. A phase of the phase change material may be changed according to the Joule's heat generated according to the amount of current. Such a phase change may be used to write data.

Meanwhile, in another exemplary embodiment, the variable resistor R may include, instead of the phase change material, perovskite compounds, a transition metal oxide, magnetic materials, ferromagnetic materials, or antiferromagnetic materials, for example.

As shown in FIG. 4B, a write operation performed on resistive memory cells may include the set write operation and the reset write operation. In FIG. 4B, the largest distribution among multiple resistance level distributions may have a reset state (for example, an erasure state). Memory cells may be changed to set states State 1~State 2 through the set write operation performed on the memory cells in the reset state.

According to an exemplary embodiment, when a data write operation is performed using an in-place update, the set write operation may be performed on some memory cells in a region including a plurality of memory cells, and the reset write operation may be performed on the some other memory cells. When it is assumed that data are written in a free block including the memory cells in the reset state in an out-of-place update, the data may be written by performing the set write operation on the memory cells. Alternatively, when the data are overwritten in a location in which invalid data are stored in the out-of-place update, the data may be written by performing the set write operation and the reset write operation.

Figure 5A:
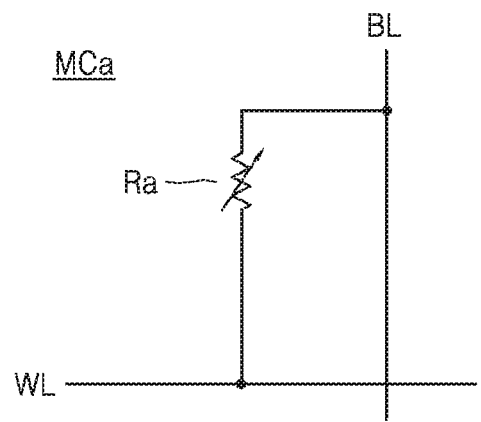
FIGS. 5A through 5C are circuit diagrams illustrating modifications of a memory cell of FIG. 4A.
Figure 5B:
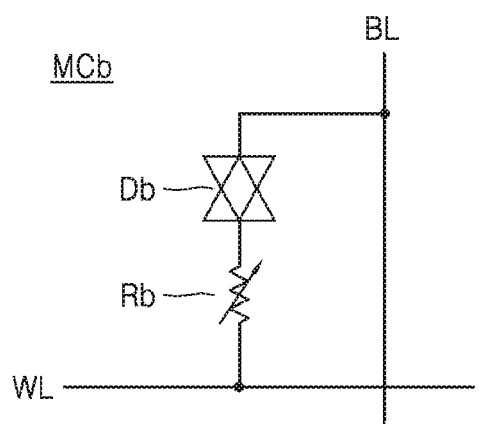
Figure 5C:
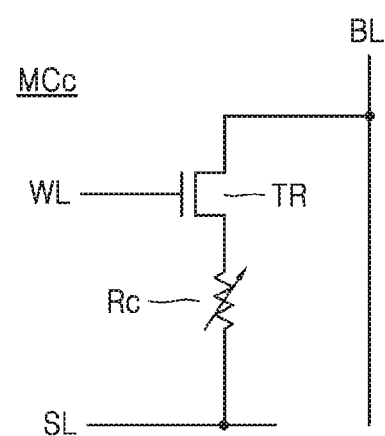

FIGS. 5A through 5C are circuit diagrams illustrating modifications of the memory cell MC of FIG. 4A.

Referring to FIG. 5A, a memory cell MCa includes a variable resistor Ra connected between the bit line BL and the word line WL. The memory cell MCa may store data by voltages applied to the bit line BL and the word line WL.

Referring to FIG. 5B, a memory cell MCb includes a variable resistor Rb and a bi-directional diode Db. The variable resistor Rb may include a resistance material for storing data. The variable resistor Rb and the bi-directional diode Db are connected between the word line WL and the bit line BL. Positions of the bi-directional diode Db and the variable resistor Rb may be switched. Leakage current may be blocked from flowing in a non-selection resistor cell through the bi-directional diode Db.

Referring to FIG. 5C, a memory cell Mc includes a variable resistor Rc and a transistor TR. The transistor TR may be a selection device, i.e., a switching device, supplying or blocking current to the variable resistor Rc according to a voltage of the word line WL. In FIG. 5C, in addition to the word line WL, a source line SL may be further provided to adjust voltage levels of both ends of the variable resistor Rc.

The memory cell MCc may be selected or may not be selected according to whether the transistor TR drive by the word line WL is turned on or off.

Figure 6:
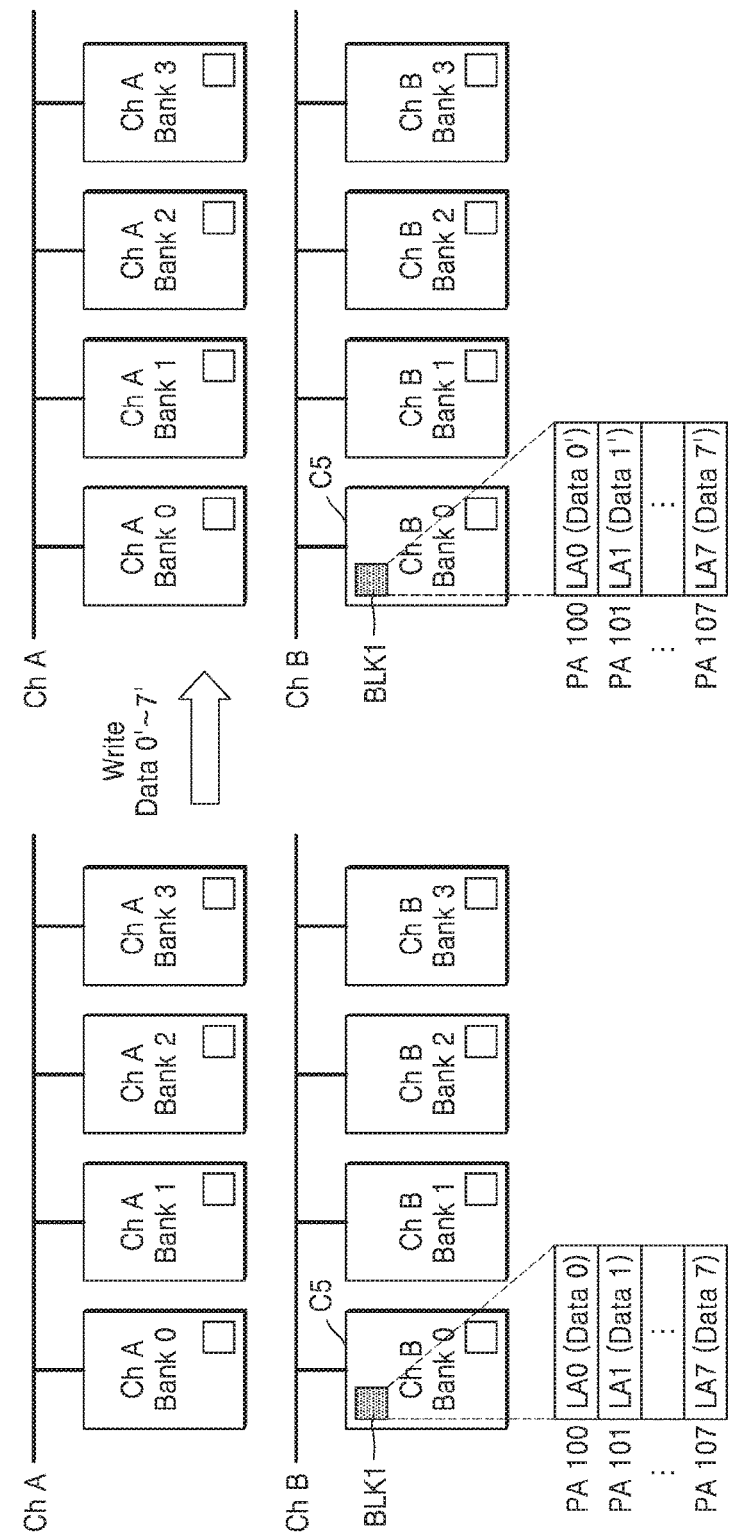
FIGS. 6 and 7 are block diagrams for explaining examples of in-place update and out-of-place update operations, respectively, according to exemplary embodiments.
Figure 7:
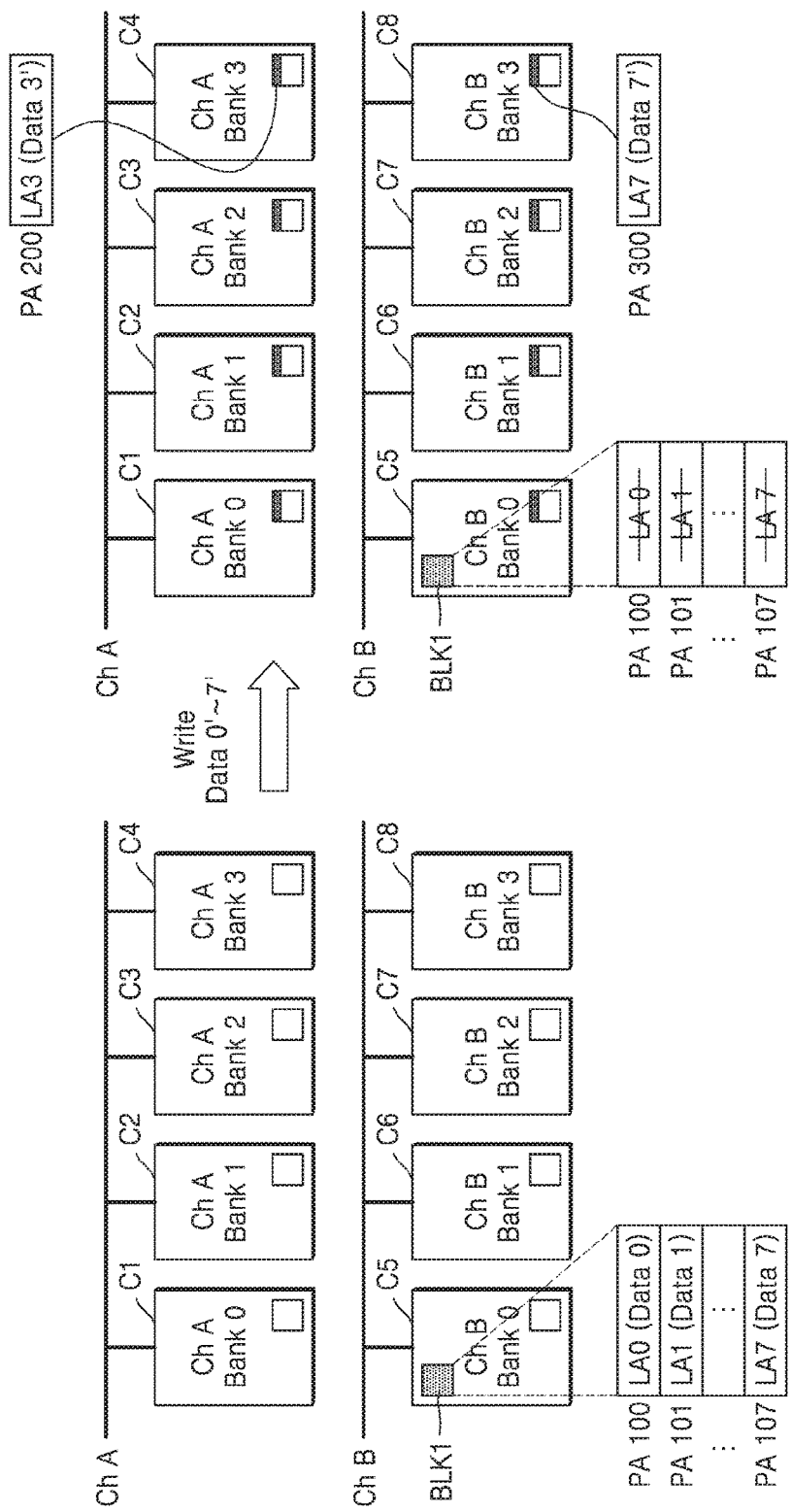

FIGS. 6 and 7 are block diagrams for explaining examples of in-place update and out-of-place update operations, respectively. FIGS. 6 and 7 illustrate examples in which a memory system includes multiple channels Ch A and Ch B and multiple memory chips connected to the channels Ch A and Ch B, and each of the memory chips includes multiple cell blocks. For example, FIGS. 6 and 7 illustrate examples in which 4 memory chips among 8 memory chips are connected to the A channel Ch A and configure first through fourth banks Bank 0~Bank 3. That is, at least two memory chips connected to different channels may be included in a same bank.

A bank BANK may be defined in various ways in a memory device. For example, memory cells of different banks BANK may be individually accessed or data relating to the different banks BANK may be input and output through different ports. Alternatively, different memory operations may be performed on the memory cells of the different bank BANK. For example, a write operation may be performed on some banks BANK, and a read operation may be performed on other some banks BANK.

A logical address provided from a host may be converted into a physical address based on address mapping information stored in the address mapping table 334 of FIG. 3. Based on the previously stored address mapping information, logical addresses LA 0~LA 7 provided by the host may be converted into physical addresses indicating a cell block (for example, a first cell block BLK1) included in a memory chip (for example, a fifth memory chip C5) corresponding to the first bank BANK 0 connected to the B channel Ch B. For example, the logical addresses LA 0~LA 7 may be converted into physical addresses PA 100~PA 107.

As shown in FIG. 6, data Data 0~Data 7 may be written in the physical addresses PA 100~PA 107 of the fifth memory chip C5 corresponding to the logical addresses LA 0~LA 7, and new data Data 0'~Data 7' may be requested to be written in a region corresponding to the logical addresses LA 0~LA 7. When the in-place update is selected, the logical addresses LA 0~LA 7 may be converted into the physical addresses PA 100~PA 107 according to the previously stored address mapping information, and thus the new data Data 0'~Data 7' may be updated in a region corresponding to the physical addresses PA 100~PA 107. Data are updated in a region instructed by the host, and thus the address mapping information between the logical addresses LA 0~LA 7 and the physical addresses PA 100~PA 107 is not changed.

As shown in FIG. 7, the new data Data 0'~Data 7' may be requested to be written in the region corresponding to the logical addresses LA 0~LA 7. When the out-of-place update is selected, a physical location corresponding to the logical addresses LA 0~LA 7 may be changed. For example, as shown in FIG. 7, memory cells of a plurality of memory chips C1~C8 may be selected in correspondence to the logical addresses LA 0~LA 7. The new data Data 0'~Data 7' may be distributed and updated in the plurality of memory chips C1~C8, and changed address mapping information between the logical addresses and the physical addresses may be updated in the address mapping table 334.

In the out-of-place update, the new data Data 0'~Data 7' may be updated in a new block of the memory chips C1~C8. Since the address mapping information is changed, a physical location corresponding to the logical addresses LA 0~LA 7 from the host may be changed. For example, the logical address LA 3 may be mapped to the physical address PA 200 of a block included in the fourth memory chip C4, and the logical address LA 7 may be mapped to the physical address PA 300 of a block included in the eighth memory chip C8. Accordingly, data that is mapped to the logical addresses LA 0~LA 7 and is stored in the physical addresses PA 100~PA 107 corresponds to invalid data. The new data Data 0'~Data 7' that is requested to be written is written in a physical location corresponding to the changed address mapping information.

Figure 8:
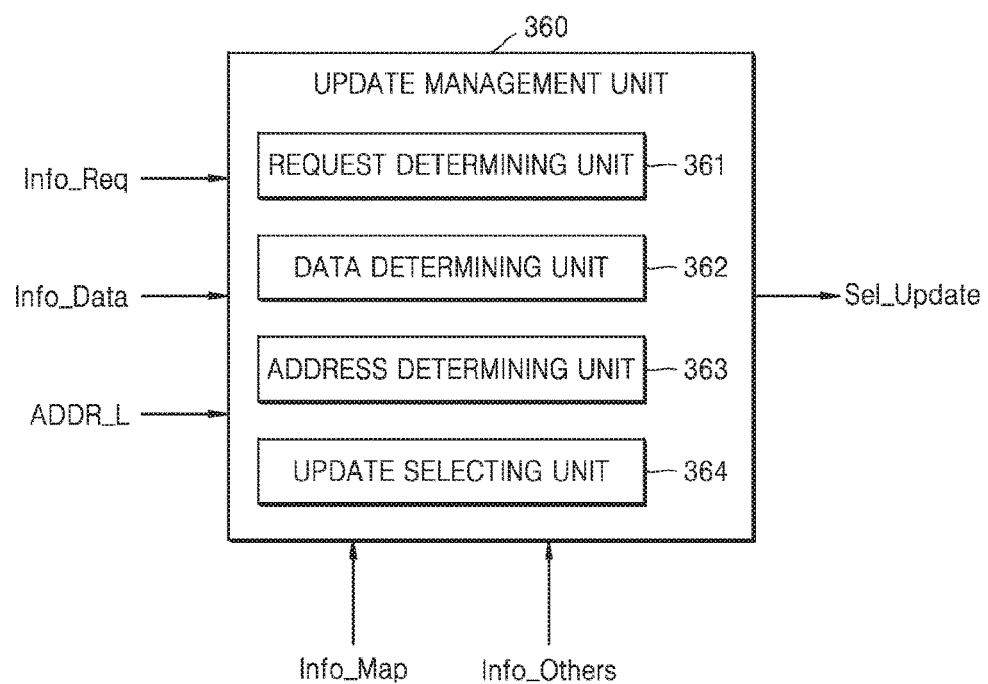
FIG. 8 is a block diagram illustrating an example of an update management unit of the memory controller of FIG. 3.

FIG. 8 is a block diagram illustrating an example of the update management unit 360 of the memory controller 300 of FIG. 3. An example of an operation of the update management unit 360 will be described with reference to FIGS. 3 and 8 below.

As shown in FIG. 8, the update management unit 360 may select an update method corresponding to a write request from an external host using at least one of information from the external host and information included in a memory system. The update management unit 360 may generate a selection result Sel_Update by referring to first information Info_Req relating to a request from the host, second information Info_Data relating to data, and a logical address ADDR_L. The update management unit 360 may generate the selection result Sel_Update by referring to mapping information Info_Map and other various pieces of information Info_others (for example, bad block information, lifespan information, etc.) as the information included in the memory system. The first information Info_Req may be information indicating a type of a request, for example. The second information Info_Data may be information indicating an amount of data corresponding to one write request, for example. The first and second information Info_Req and Info_Data may be information directly provided from the host or may be information generated by decoding a packet of the host in the memory system.

The update management unit 360 may include various pieces of functional blocks for an operation of selecting the update described above. For example, the update management unit 360 may include a request determining unit 361, a data determining unit 362, an address determining unit 363, and an update selecting unit 364. The request determining unit 361 determines the number of write requests provided from the host and provides a determination result. For example, since multiple requests may be received from the host, the requests may be stored in the request queue 340. The request determining unit 361 may monitor write requests, for example, among the multiple requests provided from the host, and provide a result of determining the number of write requests.

The data determining unit 362 monitors data (for example, write data) received in response to the write request from the host, determines an amount (or a size) of data, and provides a determination result. For example, the write data corresponding to the write requests from the host may be stored in the data queue 350. The data determining unit 362 may monitor the write data stored in the data queue 350 and provide a result of determining the amount of data.

The address determining unit 363 performs an analysis operation with respect to the logical address ADDR_L provided from the host, determines physical locations of memory cells of which access is requested by the host, and provides a determination result. For example, the logical address ADDR_L provided from the host may be stored in the request queue 340 or the data queue 350, or another separate queue. The address determining unit 363 may determine the number of memory chips of which access is requested according to a result of analyzing the logical address ADDR_L and provide a determination result. For example, physical addresses of memory cells corresponding to the logical address ADDR_L may be determined by referring to the logical address ADDR_L and the mapping information Info_Map, and thus the number of memory chips in which the data are to be written may be determined.

In addition, the address determining unit 363 may generate the determination result by referring to the various pieces of information Info_others. For example, information relating to an address of memory cells having a high wear-level provided in each memory chip, a bad block, or a block having a nearly expired lifespan, may be referred to as the various pieces of information Info_others. The address determining unit 363 may provide a result of determining characteristics of memory cells (or blocks or memory chips including the memory cells) indicated by the logical address ADDR_L according to a result of referring to the logical address ADDR_L and the various pieces of information Info_others.

The update selecting unit 364 selects the update method corresponding to the write request from the host based on the various determination results and generates the selection result Sel_Update. When the selection result Sel_Update shows that an out-of-place update is selected in response to the write request from the host, the physical locations of the memory cells corresponding to the logical address ADD_L may be changed, and changed address mapping information may be updated in the working memory 330. Under the control of the processing unit 310, a command and an address may be provided to a memory device such that the data are written according to the out-of-place update. When the data are written in a free block in the out-of-place update, an operation of generating the free block may be further performed to secure the free block.

Meanwhile, when the selection result Sel_Update shows that an in-place update is selected in response to the write request from the host, the logical address ADDR_L may be converted into a physical address based on the address mapping information previously stored in the working memory 330, and the data may be updated in memory cells (in which existing data are stored) instructed by the physical address.

The update selecting unit 364 may select both the in-place update and the out-of-place update in response to one write request from the host. For example, a part of data corresponding to the write request may be written according to the in-place update, and another part of the data may be written according to the out-of-place update.

Various examples relating to a standard for selecting the in-place update or the out-of-place update are described below.

As described above, when data are written according to the in-place update, a write request may be processed without overhead, such as an erasure operation, a garbage collection operation, and a metadata write operation. However, when the write request from a host is focused in a specific memory chip, performance of storage configured as multiple memory chips may not be maximized. Meanwhile, when the data are written according to the out-of-place update, although additional overhead may be generated, the data may be distributed and written in multiple memory chips, thereby maximizing parallelism.

Embodiments of selecting the in-place update or the out-of-place update are described with reference to FIGS. 9 through 13 below. FIGS. 9 through 13 are flowcharts illustrating methods of operating a memory system, according to exemplary embodiments.

Figure 9:
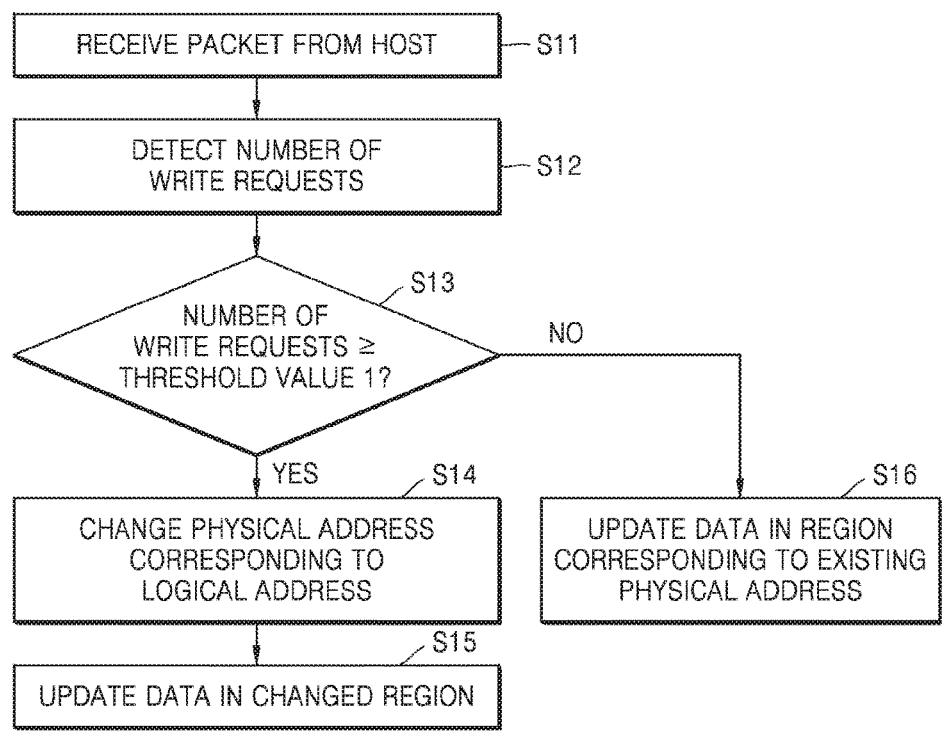
FIGS. 9 through 13 are flowcharts illustrating methods of operating a memory system, according to exemplary embodiments.

As shown in FIG. 9, the memory system receives a packet from a host (operation S11). The packet may include a request, an address, and data as various pieces of information relating to a memory operation. In addition, the packet may include various pieces of different information relating to the memory operation. The packet may be encoded and generated in the host, and may be transmitted through serial communication between the host and the memory system. However, the exemplary embodiments of the inventive concept are not necessarily limited thereto. The host and the memory system may transmit and receive the request, the address, the data, and the various pieces of information through different transmission lines.

The memory system may receive and store various signals from the host. For example, the memory system may store requests and data sequentially or continuously received from the host in a queue. The requests provided from the host may include various types of requests such as write, read, and erasure request, for example. The memory system analyzes types of requests provided from the host and detects the number of write requests therefrom (operation S12).

The detected number of write requests is compared with a predetermined threshold value, for example, a first threshold value (threshold value 1) (operation S13). As a result of the comparison, when the detected number of write requests is same as or greater than the first threshold value, an amount of data that is to be written is determined to be relatively large, and thus an out-of-place update is selected such that the data may be written in parallel in multiple memory chips included in the memory system, to perform a write operation. A physical address corresponding to a logical address provided from the host is changed (operation S14), for example, by changing mapping information of an address mapping table included in the memory system. The data from the host is updated to a region corresponding to the changed physical address (operation S15).

When it is determined (operation S13) that the detected number of write requests is less than the first threshold value, the amount of data that is to be written is determined to be relatively small. Thus, an in-place update is selected, such that a response of a data write operation may be improved and a lifespan of the memory system may be increased, to perform the write operation. The data are updated to a region corresponding to an existing physical address (operation S16), for example, mapped to a logical address provided from the host according to the address mapping information previously stored in the address mapping table included in the memory system.

Figure 10:
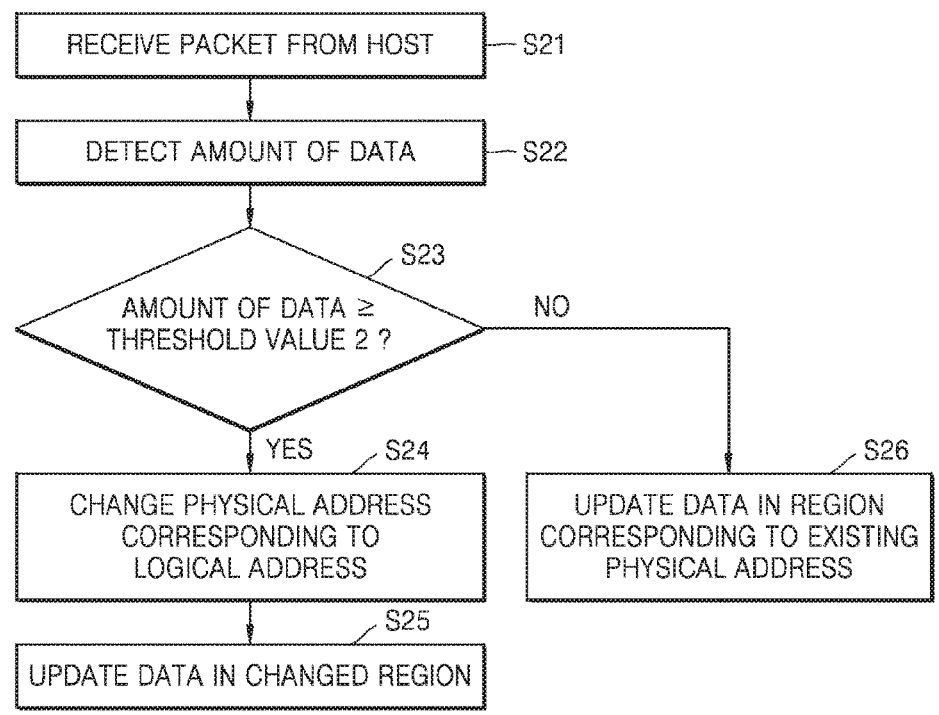

FIG. 10 is a flowchart of an example of selecting an update by referring to information relating to data, according to an exemplary embodiment.

As shown in FIG. 10, a memory system receives a packet from a host (operation S21). The memory system may sequentially or continuously receive packets from the host and may store data included in the packets in a queue.

The memory system detects an amount of data that is requested to be written by analyzing the data provided from the host (operation S22). The detected amount of the data are compared with a predetermined threshold value, for example, a second threshold value (threshold value 2) (operation S23). As a result of the comparison, when the detected amount of the data is the same as or greater than the predetermined second threshold value, an out-of-place update is selected, such that the data may be written in parallel in multiple memory chips, to perform a write operation. Accordingly, a physical address corresponding to a logical address provided from the host is changed (operation S24), and the data from the host is updated to a region corresponding to the changed physical address (operation S25).

When the detected number of write requests is less than the predetermined second threshold value (operation S23), the amount of data that is to be written is determined to be relatively small, and thus an in-place update is selected, such that a response of a data write operation may be improved and a lifespan of the memory system may be increased. Accordingly, the data are updated to a region corresponding to an existing physical address (operation S26), for example, mapped to a logical address provided from the host according to the previously stored address mapping information.

Figure 11A:
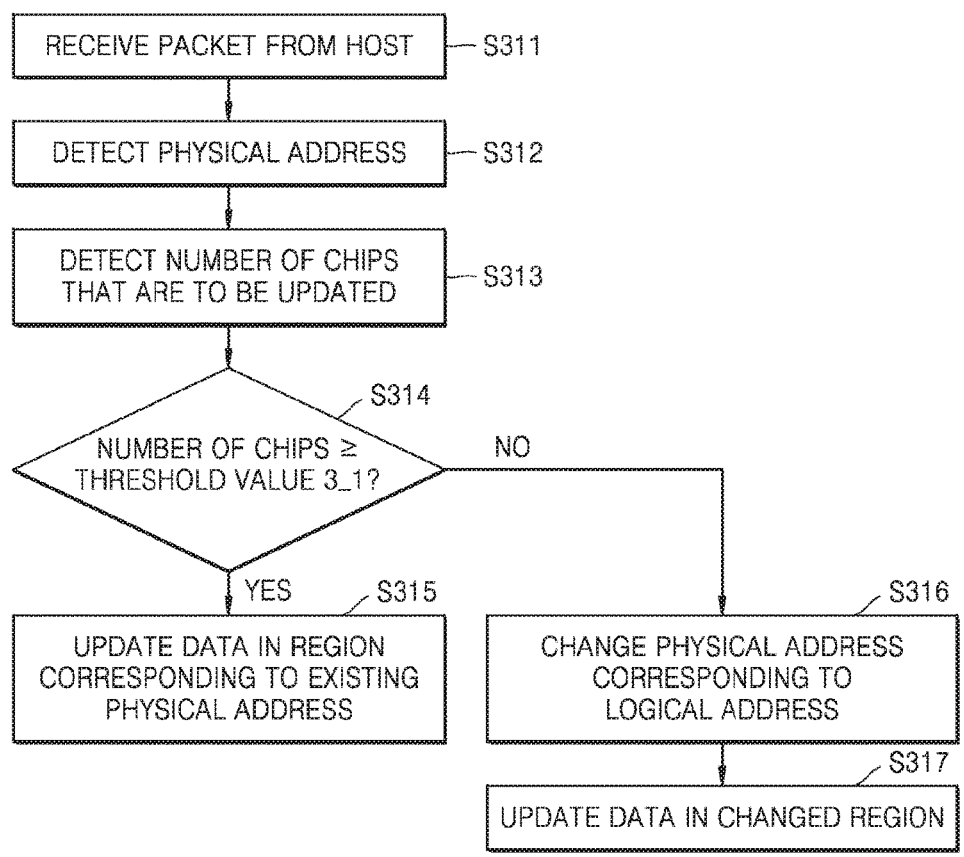
Figure 11B:
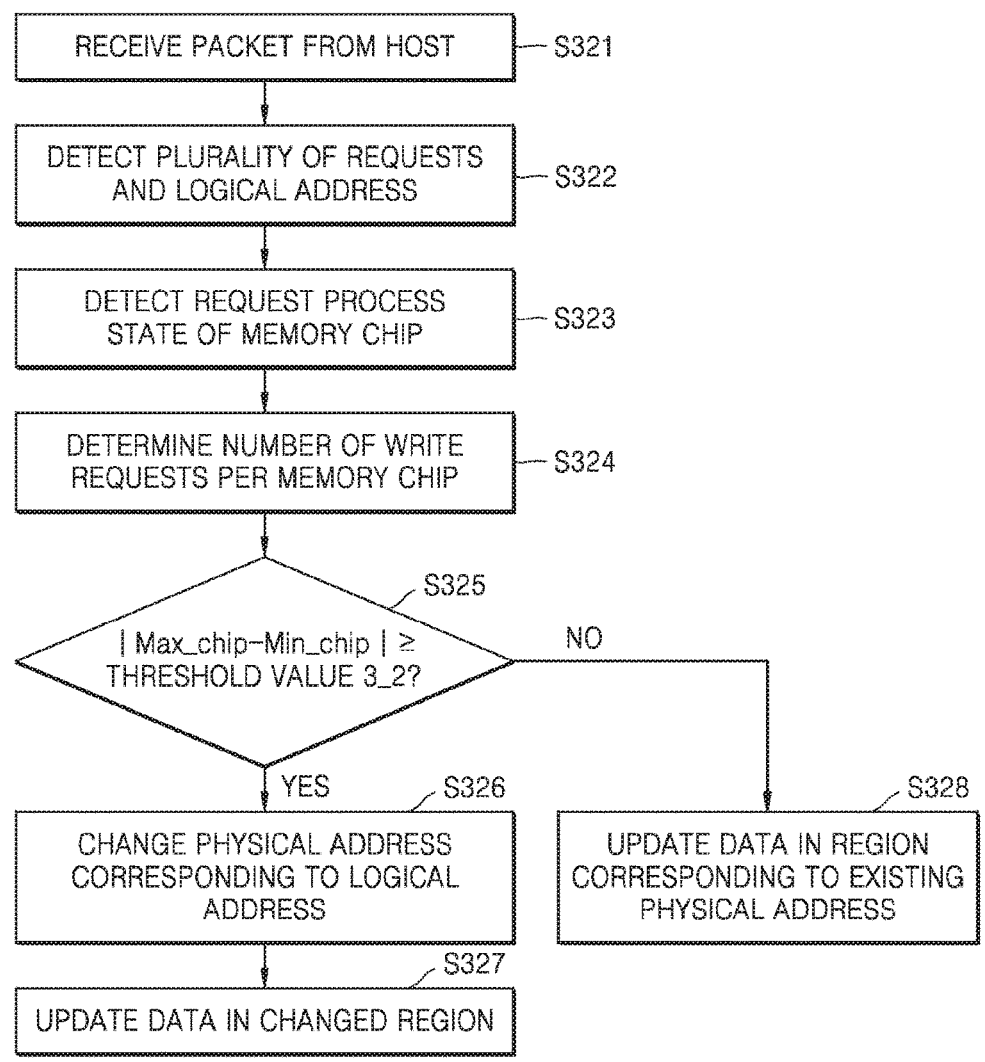

FIGS. 11A and 11B are flowcharts of examples of selecting an update by referring to information relating to an address, according to exemplary embodiments.

As shown in FIG. 11A, a memory system receives a packet from a host (operation S311). The memory system may sequentially or continuously packets from the host, extract an address (for example, a logical address) from the packets, and analyze the extracted address.

The logical address is detected from the host (operation S312). The number of memory chips that are to be updated by the logical address from the host is detected (operation S313) by referring to address mapping information stored in the memory system. For example, a physical address indicating a location in which data are actually to be written in correspondence to the logical address may be read from an address mapping table, and the number of memory chips that are to be accessed may be detected by analyzing the read physical address.

The detected number of memory chips is compared with a predetermined threshold value, for example, a threshold value $3_{\_1}$ (operation S314). As a result of the comparison, when the detected number of memory chips that are to be accessed is same as or greater than the predetermined threshold value, which means that the data requested to be written from the host are distributed and written in multiple memory chips, an in-place update is selected in order to improve a response of a data write operation and increase the lifespan of the memory system (operation S315).

When the detected number of memory chips that are to be accessed is less than the predetermined threshold value (operation S314), which means that the data requested to be written from the host are focused and written in a small number of memory chips. In this case, an out-of-place update is selected, such that the data may be written in parallel in multiple memory chips. Accordingly, a physical address corresponding to the logical address provided from the host is changed (operation S316), and the data from the host is updated to a region corresponding to the changed physical address (operation S317).

FIG. 11B is a flowchart of an example of selecting an update by detecting an address. As shown in FIG. 11B, a memory system receives a packet from a host (operation S321). The memory system may sequentially or continuously packets from the host and may store multiple requests and addresses (for example, logical addresses) in a queue included in the memory system (for example, in a memory controller). The requests and addresses stored in the queue are detected (operation S322). Thus, write requests among the multiple requests may be determined, and a memory device (or a memory chip) that is to perform the write requests may be determined.

The memory system may include multiple memory chips. Each memory chip may store a command and an address corresponding to a request from the host in a queue therein. Each memory chip may complete a data write operation in response to a write command and may provide the memory controller with information indicating completion of the data write operation. Accordingly, the memory controller detects a request processing state with respect to each of the multiple memory chips (operation S323).

According to a detection result above, the number of write requests that are to be performed in each memory chip is determined (operation S324). For example, the number of write requests that are to be performed in one memory chip may be determined using information stored in the queue of the memory controller. Alternatively, the number of write requests that are to be performed in one memory chip may be determined using the request processing state with respect to each of the memory chips and the information stored in the queue of the memory controller. That is, the number of write requests that are to be performed in one memory chip later may correspond to a value of summing the number of requests instructed by the host and the number of requests that are not performed in the memory chip.

The number of write requests with respect to each of the multiple memory chips may be different. According to an exemplary embodiment of the inventive concept, the update is selected based on a result of detecting the number of write requests with respect to each of the multiple memory chips. For example, a memory chip that is to perform the greatest number of write requests and a memory chip that is to perform the least number of write requests are selected. A difference value Max_chip−Min_chip of the numbers of write requests is calculated, and the calculated difference value is compared with a threshold value, for example, threshold value $3_{\_2}$ (operation S325). When the difference value Max_chip−Min_chip is greater than the threshold value, it may mean that write requests are focused in partial memory chips.

Accordingly, when the difference value Max_chip−Min_chip of the numbers of write requests is equal to or greater than the threshold value, an out-of-place update is selected. Thus, a physical address corresponding to a logical address provided from the host is changed (operation S326), and the data from the host is updated to a region corresponding to the changed physical address (operation S327). For example, at least partial write requests among multiple write requests may be allocated to other memory chips (for example, memory chips having a small number of requests), and thus the number of requests allocated to the memory chips may be more uniformly distributed. When the difference value Max_chip−Min_chip of the numbers of write requests is less than the threshold value (operation S325), the write requests are generally distributed in multiple memory chips uniformly. In this case, an in-place update may be selected. Accordingly, the data are updated to a region corresponding to an existing physical address mapped to the logical address provided from the host according to previously stored address mapping information (operation S328).

According to the operation of the memory system of the above-described embodiment, it may be determined if requests are uniformly distributed among memory chips, and the in-place update and the out-of-place update may be appropriately adjusted and used according to a result of the determination. For example, the data are written in a memory chip to which many write requests are allocated using the in-place update, and thus a partial write request may be processed, and the data may be written using the out-of-place update by allocating another partial write request to other memory chips.

The operation of the memory system of the above-described embodiment may be modified in various ways. For example, the in-place update or the out-of-place update may be selected by detecting requests and logical address information stored in the memory controller. Thereafter, when the requests are allocated to a plurality of memory chips, a request allocation operation may be adjusted based on a result of determining request processing states of the memory chips.

Figure 12:
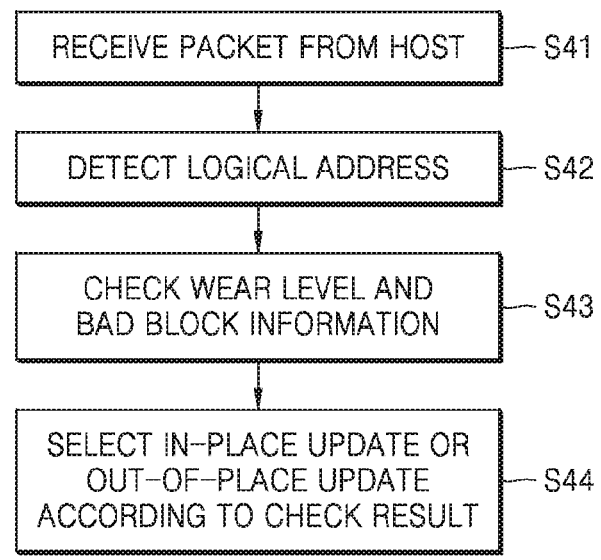

FIG. 12 is a flowchart illustrating an example of selecting an update by referring to various pieces of information, such as a wear-level, lifespan, or bad blocks, for example, according to an exemplary embodiment.

As shown in FIG. 12, a memory system receives a packet from a host (operation S41). The memory system may sequentially or continuously receive packets from the host, and detects a logical address included in the packets (operation S42). The information relating to one or more of the wear-level, lifespan, and bad block for each region with respect to memory cells included in the memory system are checked by detecting the various types of information included in the memory system (operation S43). For example, to manage the wear-level, lifespan, and bad blocks of the memory cells, the number of write operations for each page or block may be detected, information thereof may be stored, the number of erasure operations for each block may be detected, and information thereof may be stored. The memory system may check a page/block corresponding to the logical address from the host and may check information relating to the wear-level, lifespan, and bad blocks, thereby analyzing a state of a page/block that is requested to be accessed and a state of another page/block in the memory system.

According to a result of the checking, an in-place update or an out-of-place update is selected (operation S44). As an example, when the number of write operations of a page or block of a location corresponding to the logical address from the host is large, a wear-level of the page/block may be determined to be high. In this regard, when data are updated to the page/block, data reliability according to an increase in the wear-level may deteriorate, and thus the out-of-place update may be selected, thereby writing the data to a region different from a region indicated by the host.

Alternatively, when the block corresponding to the logical address from the host is the bad block, the out-of-place update is selected, and thus the data may be written in a block other than the bad block. Alternatively, when the lifespan of the memory system is determined to deteriorate, the in-place update may be selected with respect to a write request from the host in order to prevent the lifespan from further deteriorating due to an increase in the number of erasure operations on the block.

An example of selecting the in-place update or the out-of-place update based on the wear-level, lifespan, and bad block of the memory system is not necessarily limited to the above-described example. That is, exemplary embodiments of the inventive concept may be modified in various ways. For example, when a lifespan of a block on which a write operation is requested to be performed is determined to deteriorate, a memory operation may be set to write data to the block using the in-place update in order to prevent the number of erasure operations performed on the block from increasing.

Figure 13:
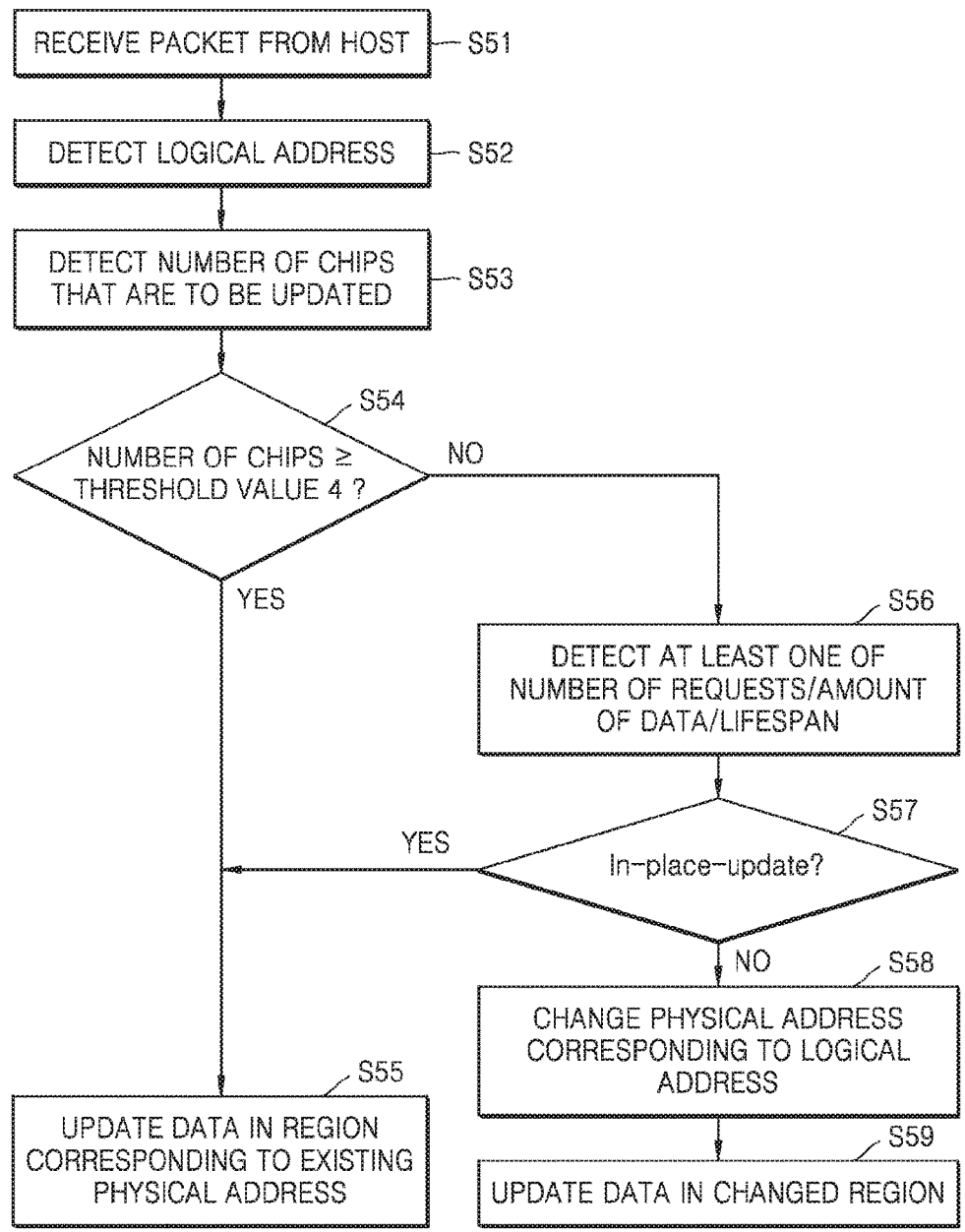

FIG. 13 is a flowchart of an example of applying priority to a selection condition when selecting an in-place update or an out-of-place update, according to an exemplary embodiment. Referring to FIG. 13, priority is applied to the number of memory chips that are to be accessed but exemplary embodiments of the inventive concept are not limited thereto. Among the above-described embodiments, the in-place update or the out-of-place update may be selected by applying priority to other various pieces of information.

As shown in FIG. 13, a memory system receives a packet from a host (operation S51). The memory system detects a logical address included in the packet received from the host (operation S52).

The number of memory chips that are to be updated by a logical address from a host is detected (operation S53) by referring to the detected logical address and address mapping information stored in the memory system. The detected number of memory chips is compared with a predetermined threshold value, for example, a fourth threshold value (threshold value 4) (operation S54).

As a result of detection, when the detected number of memory chips is equal to or greater than the predetermined threshold value, data that is requested to be written from the host may be distributed and written in a plurality of memory chips, and thus the data are updated in a region corresponding to an existing physical address (operation S55) mapped to the logical address provided from the host according to the previously stored address mapping information. That is, when the number of memory chips that are to be accessed is equal to or greater than the predetermined threshold value, the in-place update may be selected irrespective of other condition(s).

When the detected number of memory chips is less than the predetermined threshold value (operation S54), it is determined whether to write the data using the in-place update by further referring to information other than information relating to the number of memory chips that are to be accessed. For example, similar to the above-described embodiment, at least one of the number of write requests provided from the host, an amount of data provided from the host, and information relating to a wear-level/lifespan of memory cells included in the memory system is detected (operation S56). It is then determined whether to write the data in response to the write requests from the host using the in-place update according to a result of the detection (operation S57). As a result of the determination, when the number of write requests or the amount of data is small, the in-place update may be selected. When a wear-level of memory cells of a physical location corresponding to the logical address from the host is low or a lifespan of the memory system deteriorates, the in-place update may be selected. Accordingly, the data are updated in the region corresponding to the existing physical address mapped to the logical address provided from the host according to the previously stored address mapping information (operation S55).

When the out-of-place update is selected according to the result of determination (operation S57), the address mapping information stored in the memory system is changed. Thus, the physical address corresponding to the logical address provided from the host is changed (operation S58), and the data of the host are updated in a region corresponding to the changed physical address (operation S59).

Figure 14A:
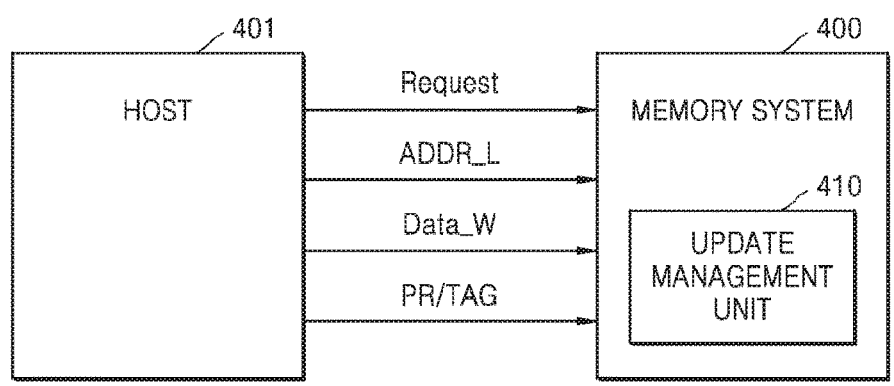
FIGS. 14A and 14B are block diagrams of a memory system and an update management unit provided in the memory system, respectively, according to another exemplary embodiment.
Figure 14B:
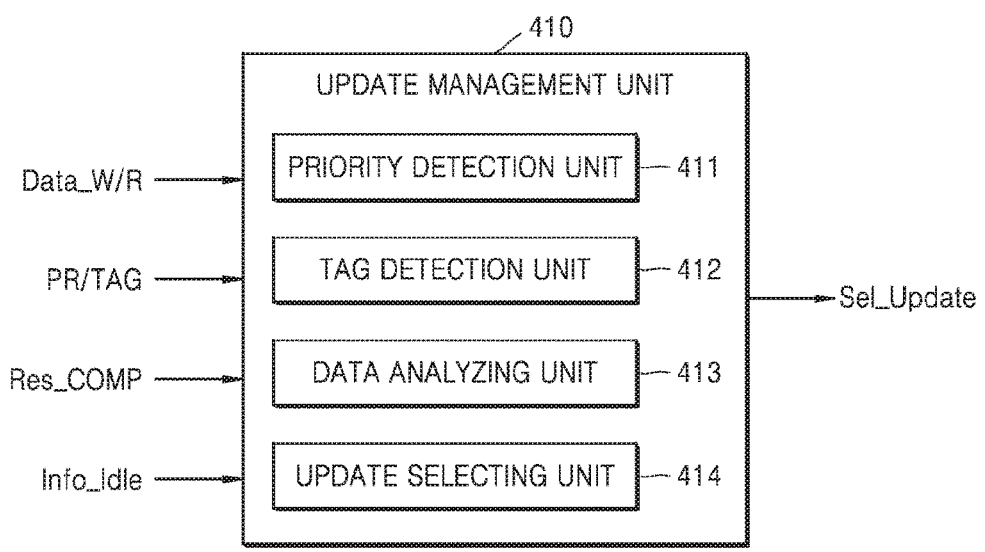

FIGS. 14A and 14B are block diagrams of a memory system 400 and an update management unit 410 provided in the memory system 400, respectively, according to another exemplary embodiment.

Referring to FIG. 14A, the memory system 400 communicates with a host 401 to receive a request Request, the logical address ADDR_L, and write data Data_W from the host 401. The memory system 400 may receive various pieces of information from the host 401, for example, priority information PR and a tag TAG. The various pieces of information PR and TAG are provided through a separate communication channel between the host 401 and the memory system 400 but embodiments of the inventive concept is not necessarily limited thereto. For example, the priority information PR may be provided through a request channel, and the tag TAG may be provided through a write data Data_W channel. Alternatively, as described above, the various pieces of information from the host 401 may be encoded as packets, and information in a packet unit may be transmitted and received between the host 401 and the memory system 400.

According to the exemplary embodiment of the inventive concept, the memory system 400 selects an in-place update or an out-of-place update in response to a write request from the host 401 using the various pieces of information PR and TAG.

The memory system 400 includes the update management unit 410. Referring to FIG. 14B, the update management unit 410 includes a priority detection unit 411, a tag detection unit 412, a data analyzing unit 413, and an update selecting unit 414. According to the exemplary embodiment, the update management unit 410 may select the in-place update or the out-of-place update by referring to at least one of the various pieces of information PR and TAG provided from the host 401 and various pieces of information included in the memory system 400, and may output the selection result Sel_Update.

The update management unit 410 may select the in-place update or the out-of-place update by referring to at least one of the write data Data_W, read data Data_R read from a region corresponding to the logical address ADDR_L from the host 401, the various pieces of information PR and TAG from the host 401, and state information Info_Idle of the memory system 400. For example, the priority detection unit 411 may detect the priority information PR and generate a detection result. The tag detection unit 412 may detect the tag TAG and generate a detection result.

The data analyzing unit 413 may perform an analysis operation using at least one of the write data Data_W, the read data Data_R, and a result Res_COMP of comparing the write data Data_W and the read data Data_R, and generate a result of the analysis operation. For example, the data analyzing unit 413 may compare bit values of the write data Data_W and the read data Data_R, analyze the number of bits of actual data values are to be changed, and generate a result of analysis. Alternatively, the data analyzing unit 413 may receive the result Res_COMP of comparing the write data Data_W and the read data Data_R, analyze the number of bits of actual data values that are to be changed, and generate a result of analysis.

The update selection unit 414 may select the in-place update or the out-of-place update by referring to the detection and analysis results of the priority detection unit 411, the tag detection unit 412, and the data analyzing unit 413. The update selection unit 414 may select the in-place update or the out-of-place update by referring to the state information Info_Idle indicating an idle state of the memory system 400.

Figure 15:
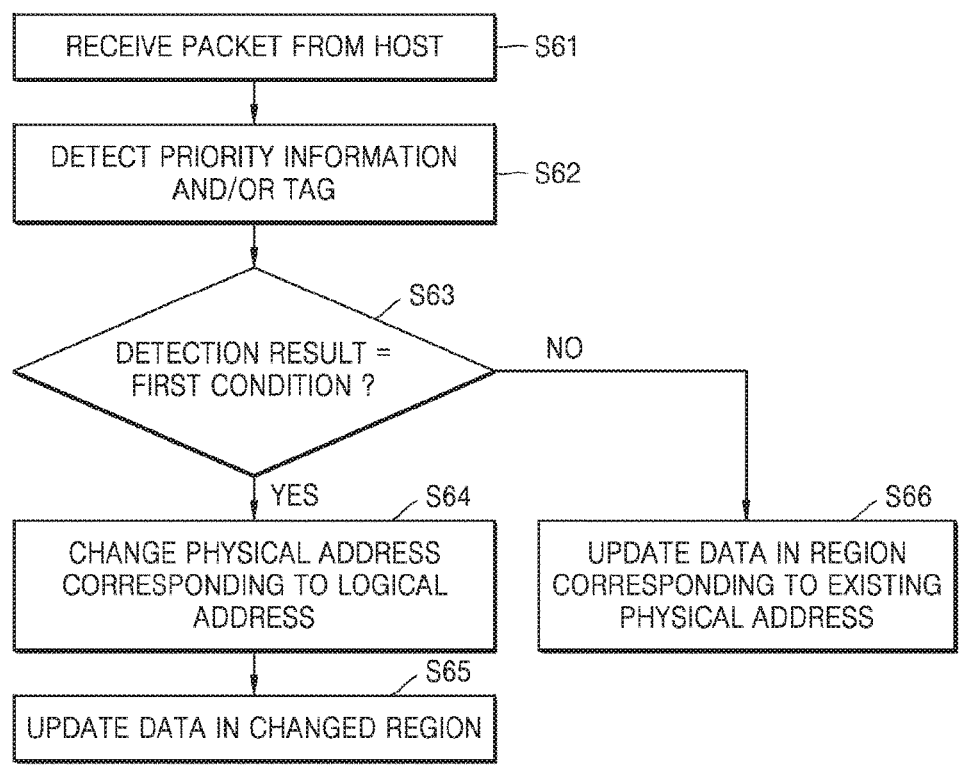
FIGS. 15 through 17 are flowcharts illustrating methods of operating a memory system, according to other exemplary embodiments.
Figure 16:
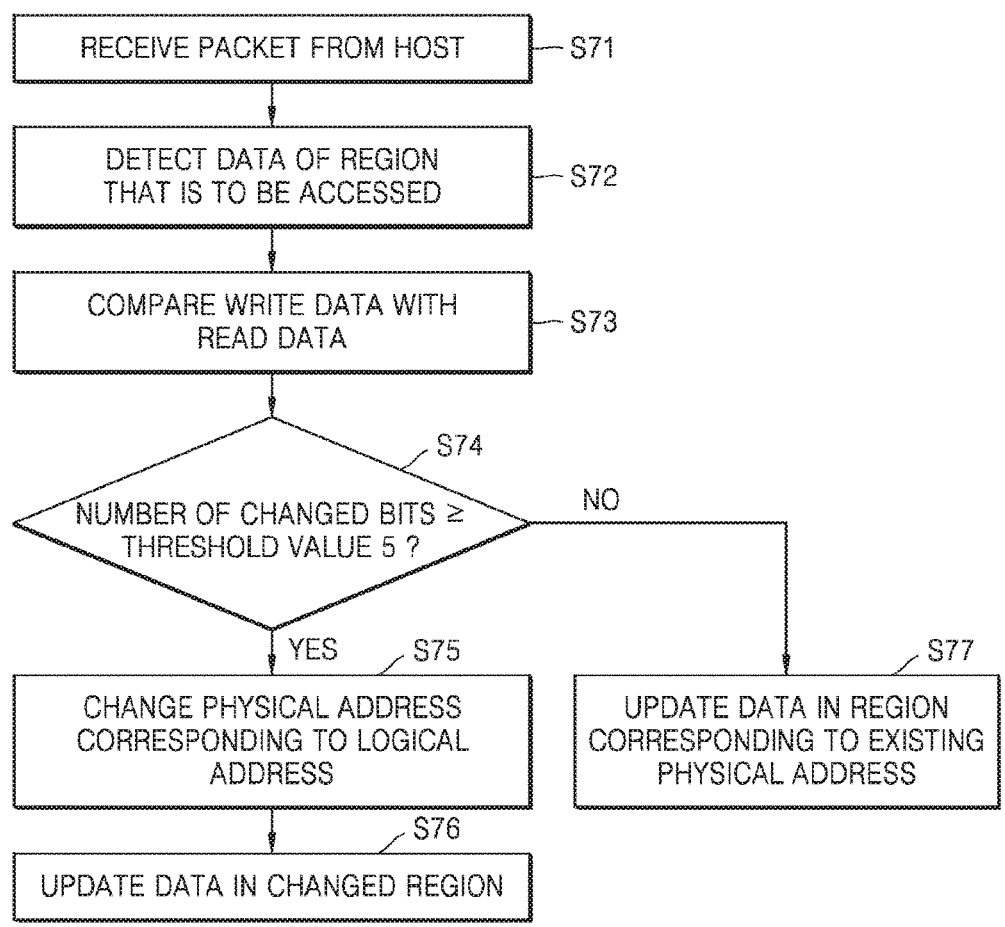
Figure 17:
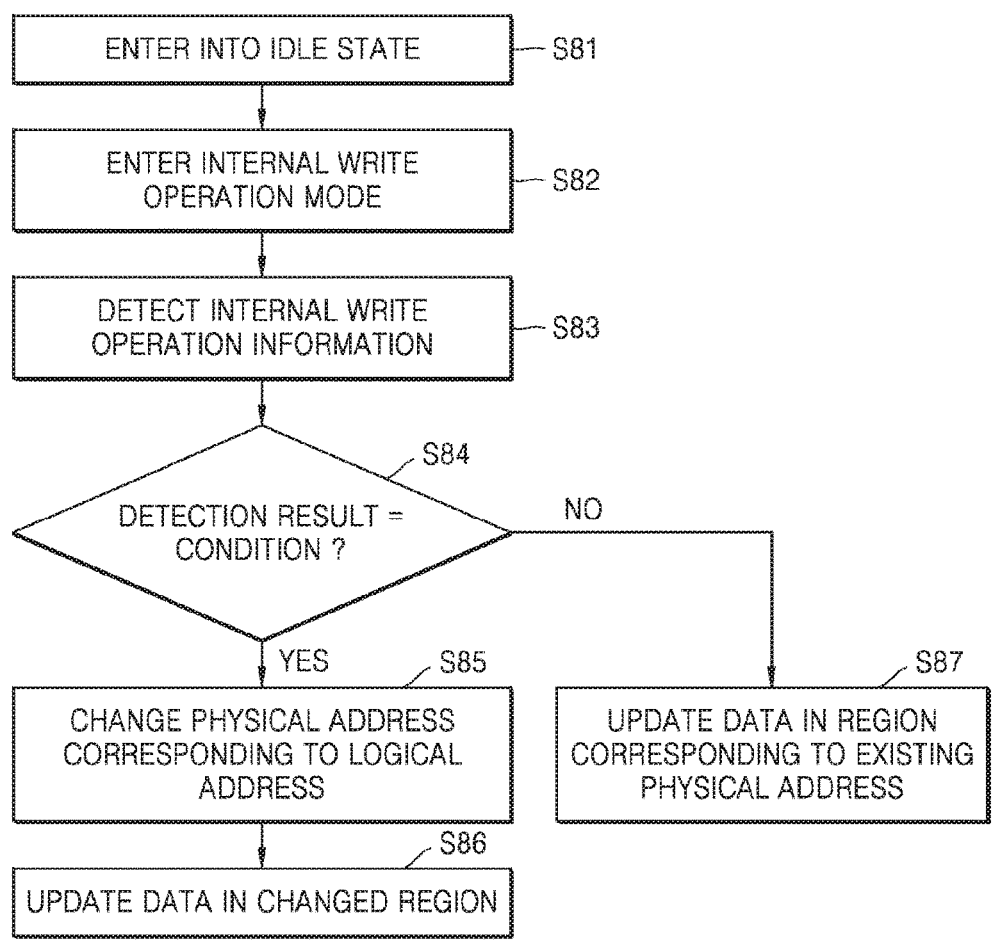

Hereinafter, examples of selectively applying the in-place update or the out-of-place update according to the embodiments illustrated in FIGS. 14A and 14B are described. FIGS. 15 through 17 are flowcharts illustrating a method of operating a memory system according to other exemplary embodiments.

Referring to FIG. 15, the memory system receives a packet from a host (operation S61). The memory system may sequentially or continuously packets from the host, and detects priority information and/or a tag included in the packets (operation S62). According to a result of detecting the priority information and/or the tag, it is determined whether a write request from the host corresponds to a first condition (operation S63).

The priority information and/or the tag may be provided to the memory system in response to each request from the host. The priority information may be set according to urgency or importance of a write request or a read request. For example, when the write request requires a fast response, the priority information corresponding to the write request may be set to a high value and provided to the memory system. Alternatively, the tag may be set according to a type of data and importance accompanied by the write request. For example, when data that is requested to be written are a previously set type of data written in a specific region of a memory device, the tag may include information indicating the type of the data. Alternatively, as a characteristic of the data requested to be written, the tag may indicate whether the data has a characteristic of being frequently updated or not frequently updated after being written one time.

When the detection result corresponds to the first condition, an out-of-place update corresponding to the write request from the host is selected. Thus, a physical address corresponding to a logical address provided from the host is changed (operation S64), and the data from the host are updated to a region corresponding to the changed physical address (operation S65). For example, when the priority information corresponding to the write request is low or the data are to be distributed and written in multiple regions of the memory device, the out-of-place update may be selected in response to the write request.

When the detection result does not correspond to the first condition (but rather corresponds to a second condition) (operation S63), the data are updated to a region corresponding to an existing physical address (operation S66) mapped to the logical address provided from the host according to previously stored address mapping information. For example, when the priority information corresponding to the write request is high or the data are to be written in a previously set region of the memory device, an in-place update is selected in response to the write request. Alternatively, one update may be selected according to a result of determining the characteristic (for example, a characteristic relating to update frequency) of the data.

FIG. 16 illustrates an example of selecting an in-place update or an out-of-place update according to a result of comparing write data and read data, according to an exemplary embodiment.

Referring to FIG. 16, the memory system receives a packet from a host (operation S71). The memory system may sequentially or continuously packets from the host and may detect a logical address included in the packets. A region that is to be accessed may be determined according to a write request from the host by referring to the extracted logical address and mapping information of an address mapping table included in the memory system.

When the memory system is implemented as a resistive memory system including resistive memory cells, data that are to be newly written may be overwritten in memory cells in which previous data are written. In this regard, when bit values of the previously written data and the data that is to be newly written are the same for each memory cell, the write operation in a corresponding memory cell may be skipped. That is, when new data are to overwrite existing data using the in-place update, data of the region that is to be accessed may be read for a data comparison operation before updating the data (operation S72).

The write data and the read data are compared to each other (operation S73). The number of bits that are to be actually changed may be detected according to the comparison operation. The number of bits that are to be changed may be compared with a predetermined threshold value, for example, a fifth threshold value (threshold value 5) (operation S74). When the number of bits that are to be changed is equal to or greater than the predetermined threshold value, the number of memory cells in which data are to be actually written is large. In this case, since a large amount of data are to be written, the out-of-place update is selected. Accordingly, a physical address corresponding to the logical address provided from the host is changed (operation S75), and the data from the host is updated to a region corresponding to the changed physical address (operation S76).

When the number of bits that are to be changed is less than the predetermined threshold value (operation S74), the number of memory cells in which the data are to be actually written is relatively small. In this case, since a small amount of data are to be written, the in-place update is selected. Accordingly, the data are updated in a region corresponding to an existing physical address (operation S77) mapped to the logical address provided from the host according to previously stored address mapping information.

FIG. 17 illustrates an example of selecting an update according to an internal state of a memory system. It may be determined whether the memory system enters into an idle state (operation S81) as the internal state of the memory system. The idle state of the memory system may be defined in various ways. For example, communication between the host and the memory system may be stopped in the idle state. Alternatively, the idle state may be a state in which, although the memory system receives a request from the host, the memory system does not perform a memory operation in response to the request.

Once the memory system enters into the idle state, the memory system enters into an internal write operation mode in the idle state (operation S82). An internal write operation may be performed due to various causes. For example, various types of internal write operations such as a garbage collection operation for securing a free block or rewriting data of memory cells having a deteriorated data storage characteristic in the idle state may be performed.

When a write location of data provided from a host is changed using an out-of-place update, existing written data may correspond to invalid data, and thus one block may include valid data and the invalid data together. During the garbage collection operation, the valid data included in one block (for example, a first block) may be written in another block (for example, a second block), and thus an erasure operation may be performed on the first block that does not include the valid data. Thus, the first block may be the free block.

Alternatively, memory cells having deteriorated data reliability may be detected in the idle state, and data may be rewritten on the detected memory cells, thereby improving fidelity of the data. According to the exemplary embodiment of the inventive concept, various pieces of information relating to the internal write operation are detected in order to check a type of the internal write operation that is to be performed in the idle state, and it is determined whether a detection result corresponds to a predetermined condition (operation S830).

The internal write operation that is to be performed in the idle state may vary. The various internal write operations may be performed using different updates. For example, when it is determined that an out-of-place update such as the garbage collection operation is necessarily applied (alternatively, when the detected information corresponds to the predetermined condition is satisfactory), address mapping information between a logical address and a physical address are changed (operation S85), and data for the internal write operation are updated to a region corresponding to a changed physical address (operation S86). Meanwhile, when a type of the internal write operation does not meet the predetermined condition (operation S84), an in-place update is selected. In this case, the data are written according to previously stored address mapping information when performing the internal write operation (operation S87).

Figure 18A:
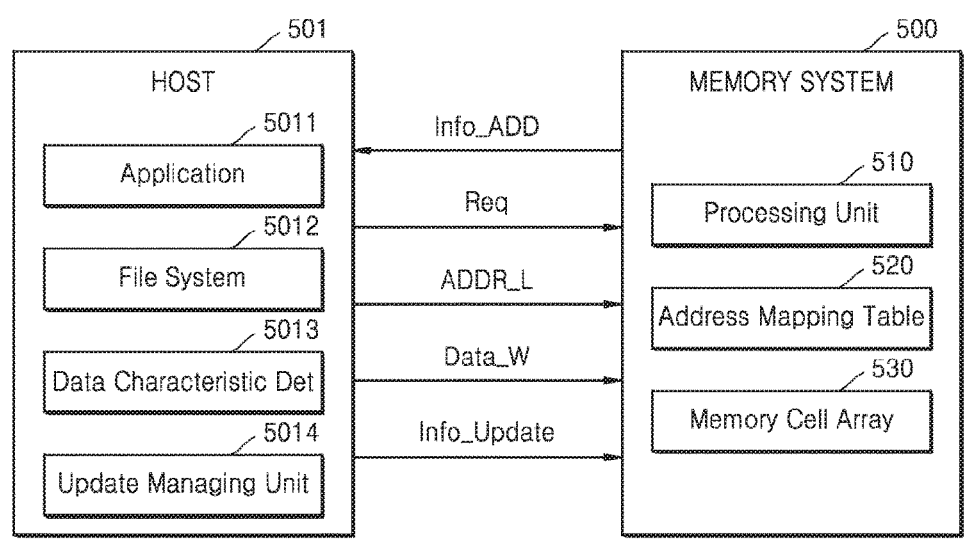
FIGS. 18A and 18B are a block diagram and a flowchart illustrating a memory system, respectively, according to another exemplary embodiment.
Figure 18B:
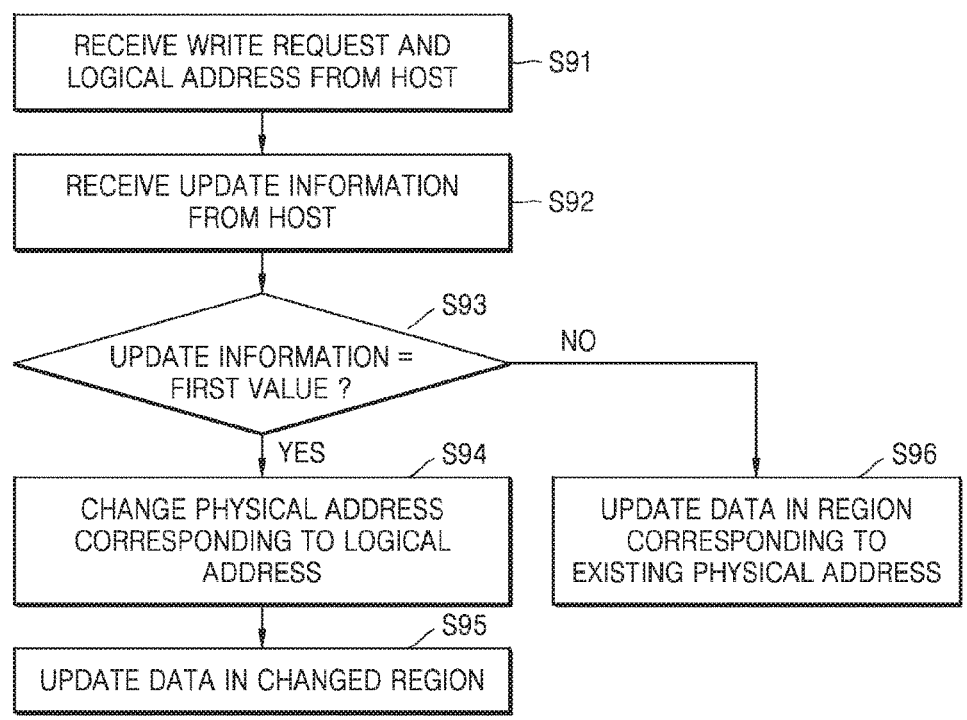

FIGS. 18A and 18B are a block diagram and a flowchart, respectively, illustrating a memory system 500 according to another exemplary embodiment. FIG. 18A further illustrates a host 501 communicating with the memory system 500. The host 501 may provide the memory system 500 with various requests Req, the logical address ADDR_L, and the write data Data_W, and the update information Info_Update relating to an update selected in response to a write request. The memory system 500 may provide the host 501 with address information Info_ADD to refer to a selection of the update.

According to an exemplary embodiment of the inventive concept, the host 501 may select an in-place update or an out-of-place update, and the memory system 500 may write data using the in-place update or the out-of-place update according to the update information Info_Update from the host 501. For example, in the depicted exemplary embodiment, the host 501 includes an application 5011 and a file system 5012 corresponding to a software layer. Further, according to the embodiment of the inventive concept, the host 501 further includes a characteristic determination unit 5013 and an update management unit 5014 to perform an update management operation. The memory system 500 includes a processing unit 510, an address mapping table 520, and a memory cell array 530.

The host 501 may select whether to request a data write based on the in-place update or the out-of-place update according to a method identical or similar to at least one of the above-described embodiments. The application 5011 may generate a write request or a read request with respect to the memory system 500. The file system 5012 may receive the write request or the read request and generate a command and a logical address that are to be provided to the memory system 500.

The data characteristic determination unit 5013 may perform an operation of determining a characteristic of data that is to be provided to the memory system 500 from the host 501, determine importance of the data, a type of the data, and urgency in the same or similar manner as the above-described embodiments, and generate a result of determination.

The update management unit 5014 may select an update method corresponding to the write request provided by the host 501 using at least one of various pieces of information included in the host 501 and the address information Info_ADD provided from the memory system 500. The address information Info_ADD may include various pieces of information, for example, address mapping information and information relating to a wear-level/bad block/lifespan. For example, the in-place update or the out-of-place update may be selected by determining the number of write requests provided to the memory system 500, an amount of data provided to the memory system 500, the number of memory chips that are to be accessed determined through the logical address ADDR_L and the address information Info_ADD. Under the control of the processing unit 510, the memory system 500 writes data to the memory cell array 530 using the in-place update or the out-of-place update by referring to the update information Info_Update provided from the host 501 in response to a write request from the host 501.

FIG. 18B is a flowchart illustrating a method of operating a memory system according to the embodiment illustrated in FIG. 18A.

Referring to FIG. 18B, the memory system receives a write request and a logical address corresponding to the write request from a host (operation S91). As described above, the host may select an update method by referring to internal information thereof and/or information provided from the memory system, and may provide update information according to a result of selection. The memory system receives the update information from the host (operation S92).

The memory system determines whether the update information has a first value indicating the out-of-place update (operation S93). As a result of determination, when the update information corresponds to the first value, data accompanied by the write request from the host are written in memory cells using the out-of-place update. For example, a physical address corresponding to the logical address provided from the host is changed (operation S94), and the data from the host are updated to a region corresponding to the changed physical address (operation S95). When the update information does not correspond to the first value (operation S93), the data accompanied by the write request from the host is written in the memory cells using the in-place update. For example, the data are updated to a region corresponding to an existing physical address mapped to the logical address provided from the host according to previously stored address mapping information (operation S96).

Figure 19A:
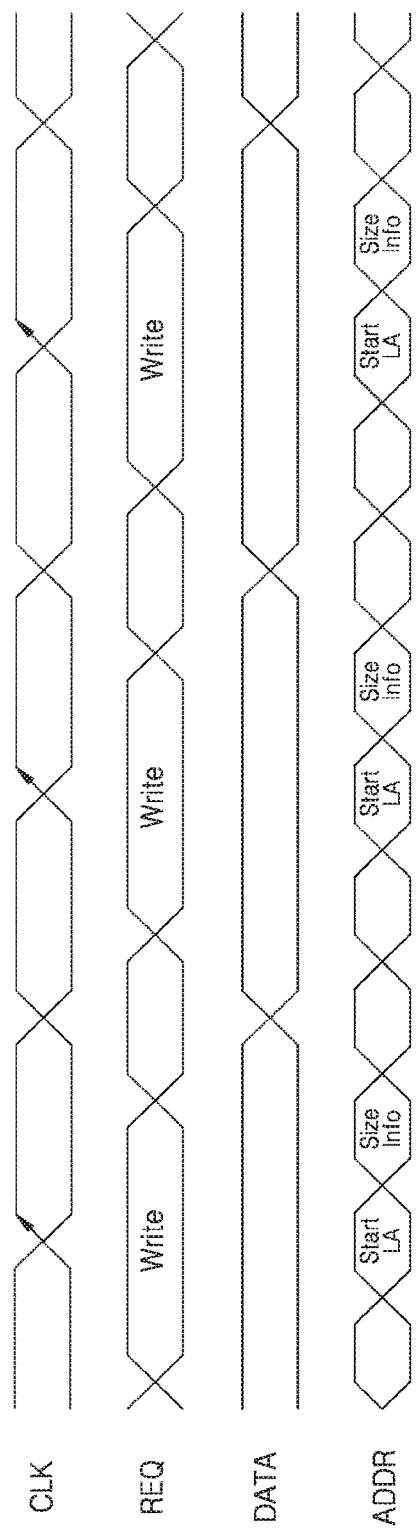
FIGS. 19A through 19C are waveform diagrams illustrating signals transmitted and received between a host and a memory system, according to exemplary embodiments.
Figure 19B:
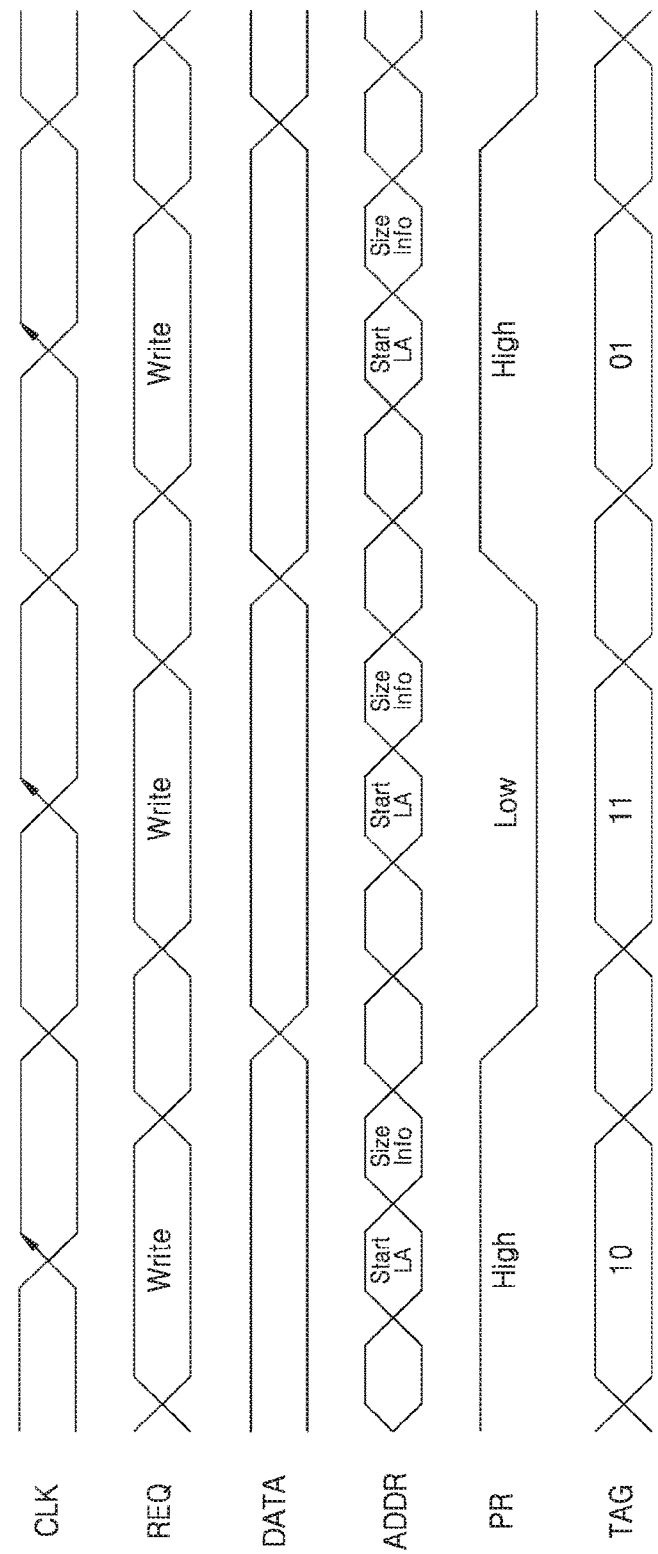
Figure 19C:
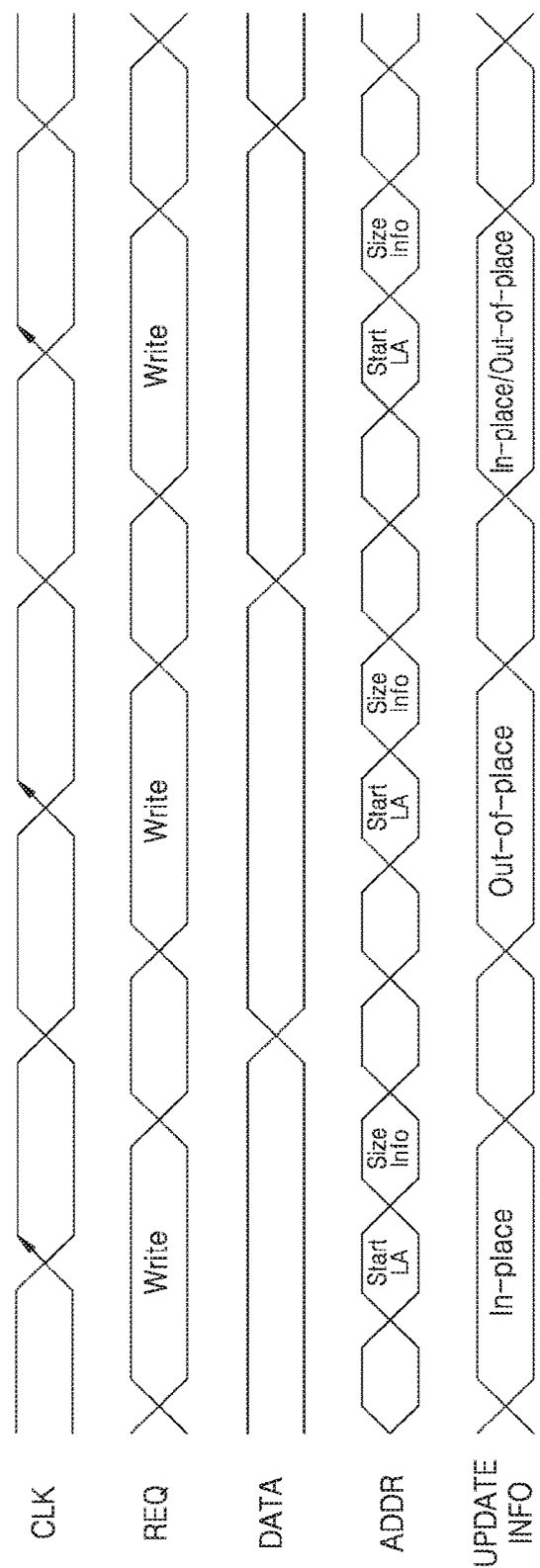

FIGS. 19A through 19C are waveform diagrams illustrating signals transmitted and received between a host and a memory system, according to exemplary embodiments.

Referring to FIG. 19A, the host may provide the memory system with a clock CLK, the request REQ, the data DATA, and the address ADDR (for example, a logical address). Since a write request is received in the memory system, write data corresponding to the write request may be provided to the memory system, and the address ADDR indicating a logical location in which data requested to be written are to be stored may be provided to the memory system. The address ADDR may be provided in various forms, for example, information Start LA indicating a start of the logical address and size information Size Info indicating a size of data to be written. According to the above-described embodiments, the in-place update or the out-of-place update may be selected using information regarding the address ADDR from the host.

Meanwhile, referring to FIG. 19B, the host may further provide the memory system with the priority information PR and information regarding the tag TAG. The priority information PR may be provided in various forms. For example, priority may be determined according to high or low information. Various types of data may be determined according to the information regarding the tag TAG. One or more bit values may constitute the information regarding the tag TAG. A characteristic of data (for example, whether the data are system data or user data, or an update frequency characteristic of written data) may be determined according to a value of the information regarding the tag TAG. According to the above-described embodiments, an update may be selected by further using the priority information PR and/or the information regarding the tag TAG.

Meanwhile, referring to FIG. 19C, the host may further provide the memory system with the update information Update_Info. According to the above-described embodiments, the host may select an update method for itself and may provide the memory system with information indicating the selected update method as the update information Update_Info. The memory system may write the data that is requested to be written using the in-place update or the out-of-place update according to a state of the update information Update_Info. Alternatively, the memory system may write data received in response to one write request using the in-place update or the out-of-place update.

Figure 20:
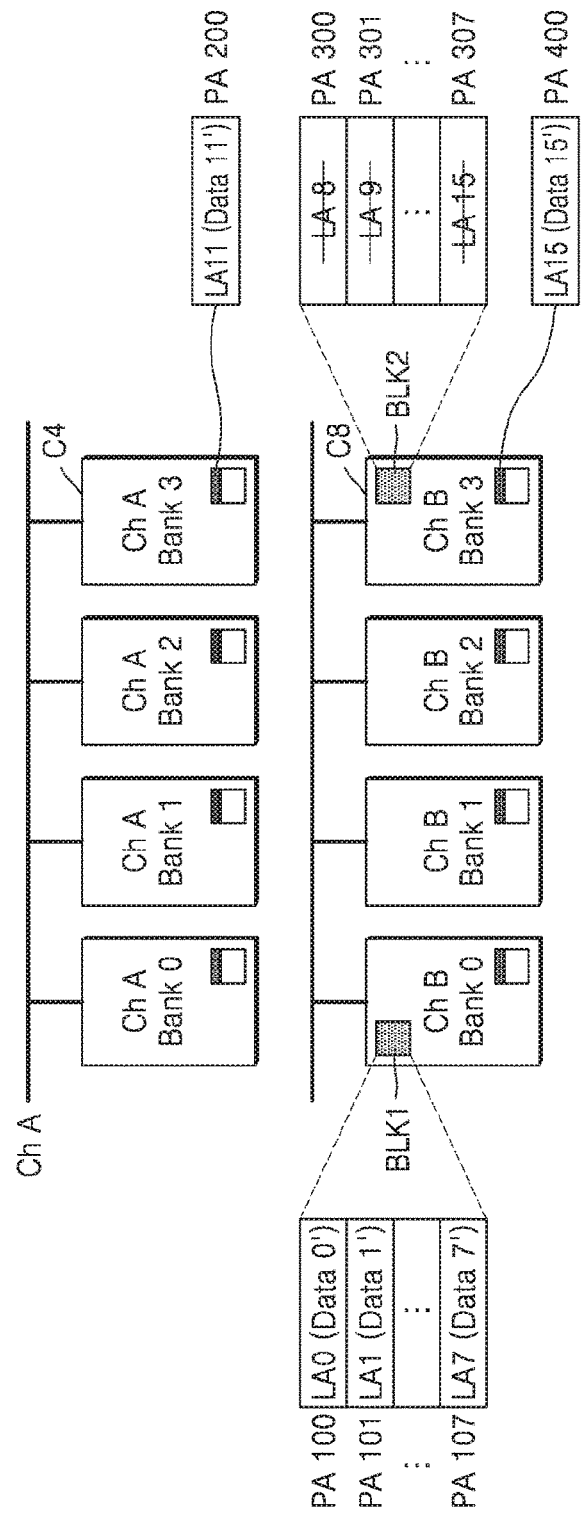
FIGS. 20 and 21 are block diagrams illustrating examples of operations of a memory system according to other exemplary embodiments.
Figure 21:
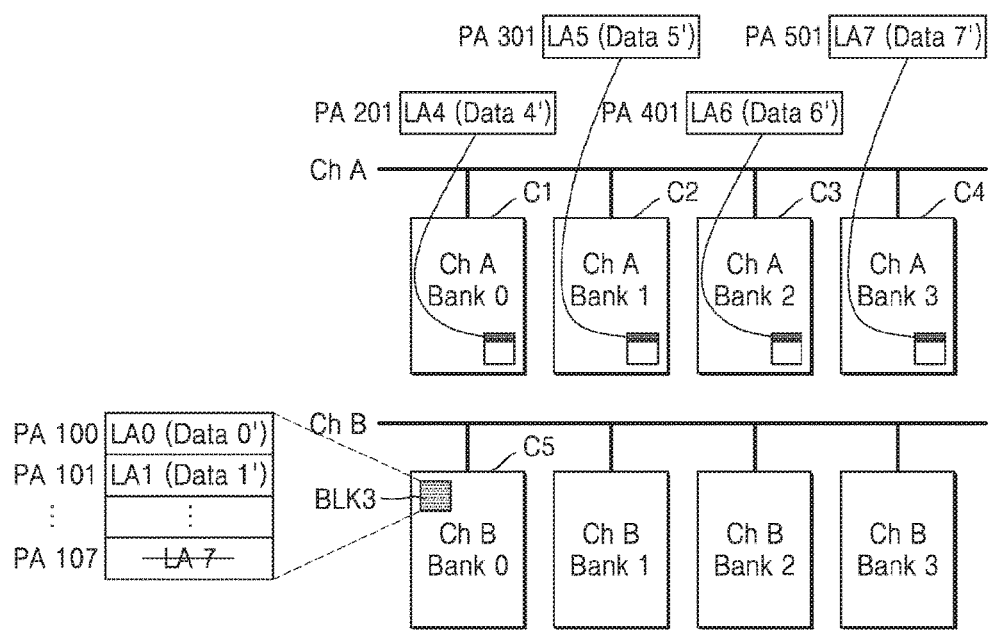

FIGS. 20 and 21 are block diagrams illustrating examples of operations of a memory system, according to exemplary embodiments.

FIG. 20 illustrates an example of designating a specific region of a memory cell array of the memory system and fixing one update to a write operation on the designated specific region. The configuration of the memory system of FIG. 20 is the same as or similar to that of the memory system of FIGS. 6 and 7, and thus a detailed description thereof is omitted.

One or more regions (hereinafter referred to as an in-place region) of the memory system corresponding to a specific logical address from a host may be previously set, such that data are written using an in-place update. For example, the logical addresses LA 0~LA 7 may be mapped to the physical addresses PA 100~PA 107 of the first cell block BLK 1 provided in the fifth memory chip C5, and the data may be written in a region corresponding to the physical addresses PA 100~PA 107 using the in-place update. Accordingly, when the new data Data 0'~Data 7' are requested to be written in correspondence to the logical addresses LA 0~LA 7, data of the region corresponding to the physical addresses PA 100~PA 107 are updated according to previously stored address mapping information.

Meanwhile, one or more regions (hereinafter referred to as an out-of-place region) of the memory system corresponding to another specific logical address may be previously set such that data are written using an out-of-place update. For example, according to currently stored address mapping information, logical addresses LA 8~LA 15 may be mapped to physical addresses PA 300~PA 307 of a second cell block BLK 2 provided in the eighth memory chip C8. If new data Data 8'~Data 15' are requested to be written in correspondence to the logical addresses LA 8~LA 15, a physical location corresponding to the logical addresses LA 8~LA 15 may be changed. For example, the logical address LA 11 may be mapped to a physical address PA 200 of a cell block provided in the fourth memory chip C4, and the new data Data 11' may be written in a region corresponding to the physical address PA 200. The logical address LA 15 may be mapped to the physical address PA 400 of a cell block provided in the eighth memory chip C8, and the new data Data 15' may be written in a region corresponding to the physical address PA 400.

Meanwhile, a determination operation may be performed on a logical address with respect to which the in-place update or the out-of-place update is not fixed according to the above-described various embodiments, and one update may be selected as a result of the determination operation.

FIG. 21 illustrates an example of writing a part of data corresponding to one write request using an in-place update and writing another part of the data using an out-of-place update. For example, along with the write request, the logical addresses LA 0~LA 7 and the data Data 1'~Data 7' may be received, and the logical addresses LA 0~LA 7 may be mapped to the physical addresses PA 100~PA 107 of a third cell block BLK 3 of the fifth memory chip C5 according to previously stored mapping information. According to a result of selecting an update method, the partial write data Data 0'~Data 3' may be written using the in-place update, and the other write data Data 4'~Data 7' may be written using the out-of-place update.

Accordingly, the data Data 0'~Data 3' corresponding to the logical addresses LA 0~LA 3 may be written in a region corresponding to the physical addresses PA 100~PA 103 of the fifth memory chip C5 according to the previously stored mapping information. Meanwhile, the data Data 4'~Data 7' corresponding to the logical addresses LA 4~LA 7 may be written in other memory blocks (for example, blocks of the first through fourth memory chip C1~C4). For example, since address mapping information is changed, the logical address LA 4 may be mapped to a physical address PA 201, and the logical address LA 7 may be mapped to a physical address PA 501. The data Data 4'~Data 7' may be written in regions instructed by physical addresses PA 201, PA 301, PA 401, and PA 501 based on the changed address mapping information.

Figure 22:
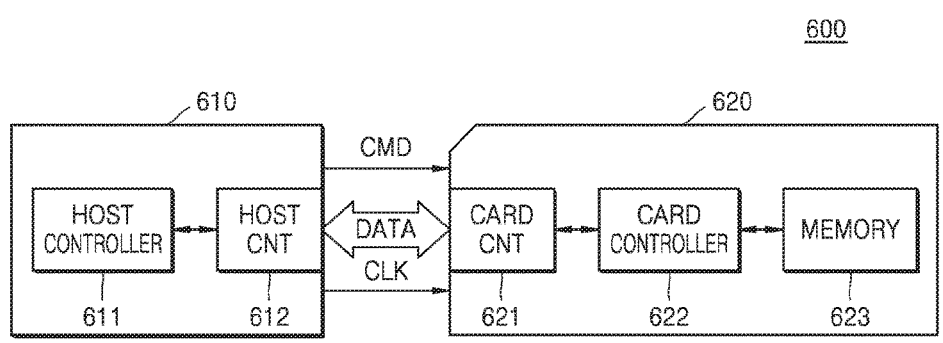
FIG. 22 is a block diagram of an example in which a memory system, according to exemplary embodiments, is applied to a memory card system.

FIG. 22 is a block diagram of an example in which a memory system according to exemplary embodiments is applied to a memory card system 600. The memory card system 600 is assumed to be a resistive memory system, for purposes of illustration.

Referring to FIG. 22, the memory card system 600 includes a host 610 and a memory card 620. The host 600 includes a host controller 611 and a host connector 612. The memory card 620 includes a card connector 621, a card controller 622, and a memory system 623. In this regard, the memory system 623 may be implemented using embodiments illustrated in FIGS. 1 through 21. Accordingly, the memory system 623 may include a memory controller and a resistive memory device, may select an in-place update or an out-of-place update in response to a write request from the host 610, may write data in an existing location corresponding to a logical address from the host 610 according to a result of selection or may change a physical address corresponding to the logical address from the host 610 and may write the data in a changed location, according to the various embodiments.

The host 610 may write data to the memory card 620 or read data stored in the memory card 620. The host controller 611 may transmit the command CMD, the clock signal CLK generated in a clock generator (not shown) in the host 610, and data DATA to the memory card 620 through the host connector 612.

In response to the command CMD received using the card connector 621, the card controller 622 may provide the memory system 623 with data in synchronization with a clock signal generated by a clock generator (not shown) in the card controller 622. The memory system 623 may store data transmitted from the host 610.

The memory card 920 may be a compact flash card (CFC), a Microdrive, a smart media card (SMC), a multimedia card (MMC), a security digital card (SDC), a universal flash storage (UFS), a memory stick, or a universal serial bus (USB) flash memory driver, for example.

Figure 23:
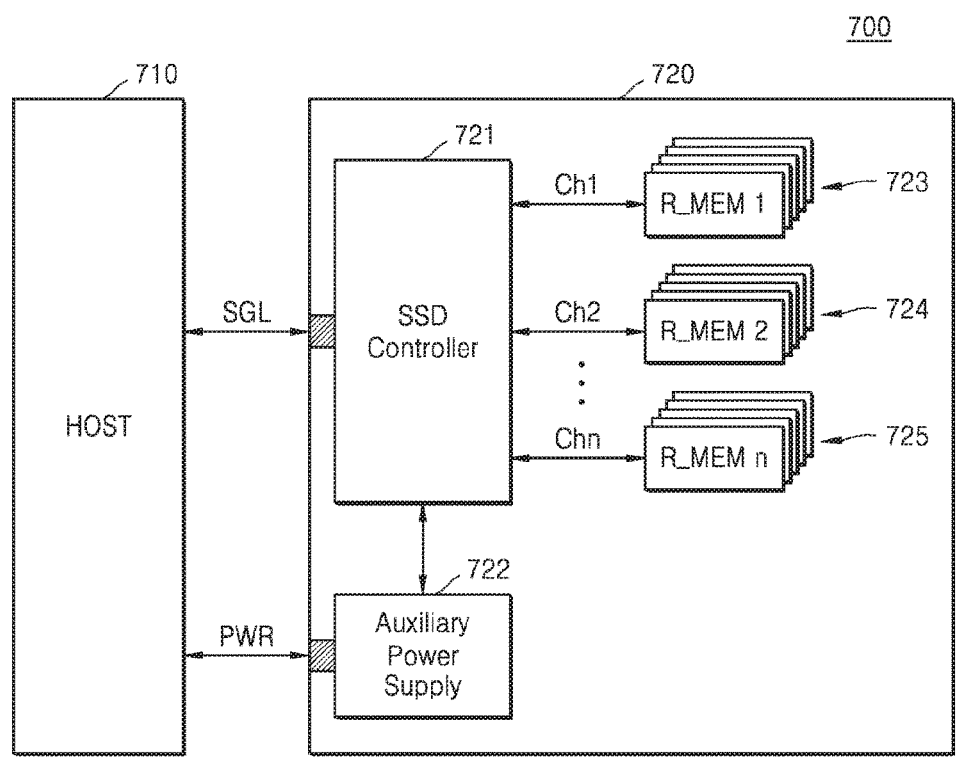
FIG. 23 is a block diagram of an example in which a memory system, according to exemplary embodiments, is applied to a solid state disk (SSD) system.

FIG. 23 is a block diagram of an example in which a memory system is applied to a solid state disk (SSD) system 700, according to exemplary embodiments.

Referring to FIG. 23, the SSD system 700 includes a host 710 and an SSD 720. The SSD 720 may transmit and receive a signal to and from the host 710 via a signal connector, and may receive power via a power connector. The SSD 720 includes an SSD controller 721, an auxiliary power supply 722, and a multiple memory systems, indicated by memory systems 723, 724, and 725. Accordingly, each of the memory systems 723, 724, and 725 may include a memory controller and a resistive memory device, may select an in-place update or an out-of-place update in response to a write request from the host 710, may write data in an existing location corresponding to a logical address from the host 710 according to a result of selection or may change a physical address corresponding to the logical address from the host 710 and may write the data in a changed location, according to the various embodiments.

Figure 24:
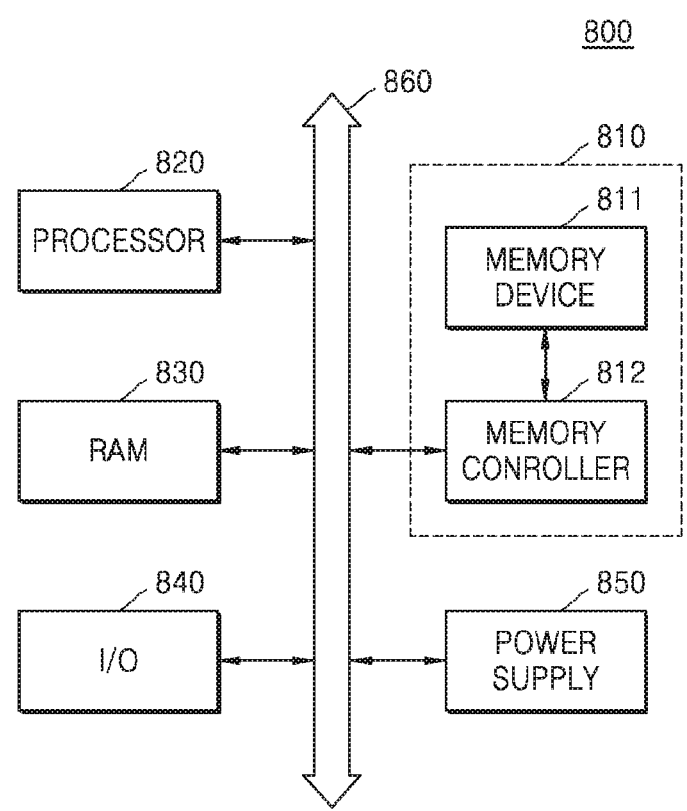
FIG. 24 is a block diagram of a computing system including a memory system, according to exemplary embodiments.

FIG. 24 is a block diagram of a computing system 800 including a memory system, according to exemplary embodiments. The memory system 800 is assumed to be a resistive memory system.

Referring to FIG. 24, the computing system 800 includes a memory system 810, a processor 820, RAM 830, an input/output device 840, and a power supply 850. The memory system 810 includes a memory device 811 and a memory controller 812. Meanwhile, although not illustrated in FIG. 24, the computing system 800 may further include ports by which to communicate with a video card, a sound card, a memory card, a USB device, or other electronic appliances. The computing system 800 may be a personal computer or a portable electronic device, such as a laptop computer, a mobile phone, a personal digital assistant (PDA) or a camera, for example.

The processor 820 may perform particular computations and tasks. According to exemplary embodiments, the processor 820 may be a micro-processor or a central processing unit (CPU). The processor 820 may communicate with the RAM 830, the input/output device 840, and the memory system 810 via a bus 860, such as an address bus, a control bus, or a data bus, for example. The memory system 810 may be implemented using a resistive memory of exemplary embodiments illustrated in FIGS. 1 through 21.

According to an exemplary embodiment, the processor 820 may also be connected to an extension bus, such as a peripheral component interconnect (PCI) bus.

The RAM 830 may store data needed in operating the computing system 800. As described above, the RAM 830 may be an RRAM. Alternatively, the RAM 830 may be a DRAM, a mobile DRAM, an SRAM, a PRAM, an FRAM, an MRAM, or the like.

The input/output device 840 may include an input unit, such as a keyboard, a keypad, or a mouse, and an output unit, such as a printer or a display, for example. The power supply 850 may supply an operating voltage needed in operating the computing system 800.

Figure 25A:
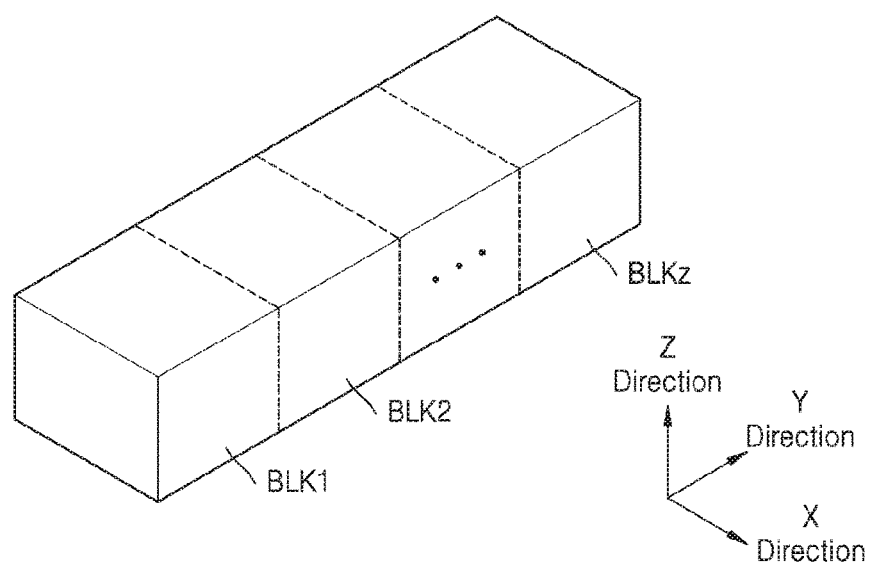
FIGS. 25A and 25B are structure and circuit diagrams, respectively, illustrating an example of a memory device of FIG. 1.
Figure 25B:
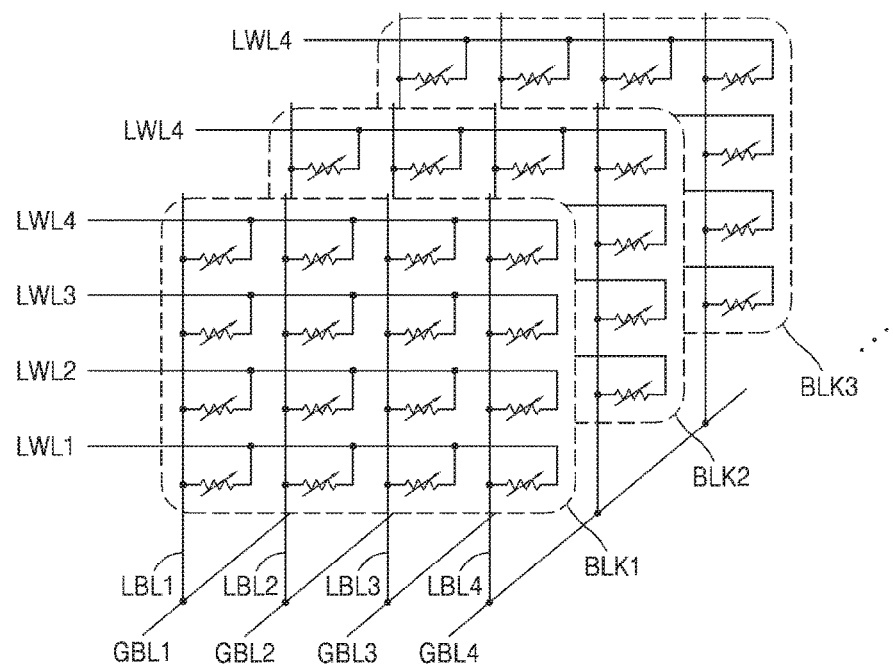

FIGS. 25A and 25B are structure and circuit diagrams, respectively, illustrating an example of the memory device 120 of FIG. 1. For example, FIGS. 25A and 25B illustrate examples of arranging memory cells of the memory cell array 121 of the memory device 120 in a three-dimensional (3D) structure.

Referring to FIGS. 25A and 25B, the memory cell array 121 includes multiple memory blocks BLK1~BLKz. Each of the memory blocks BLK1~BLKz has a 3D structure (or a vertical structure). Each of the memory blocks BLK1~BLKz may include a plurality of cell strings extending in a direction perpendicular to a substrate. The cell strings of one of the memory blocks BLK1~BLKz may be connected to the plurality of bit lines BL, one or more string selection lines, and the plurality of word lines WL. The cell strings of the memory blocks BLK1~BLKz may share the plurality of bit lines BL.

FIG. 25B illustrates an example of implementing the memory blocks BLK1~BLK3 of FIG. 25A, but does not include a selection device that may be implemented as a diode or a transistor for convenience of description.

Referring to FIG. 25B, the memory cell array 121 may include the memory blocks BLK1~BLK3 that are stacked in a 3D arrangement. The memory cell array 121 may include a plurality of local bit lines LBL1~LBL4 extending in parallel to a z axis direction and a plurality of local word lines LWL1~LWL4 extending in parallel to a y axis direction perpendicular to the z axis. The local bit lines LBL1~LBL4 may be connected to global bit lines GBL1~GBL4.

In the first memory block BLK1, memory cells of the first cell array 121 may be connected between the local word lines LWL1~LWL4 and the local bit lines LBL1~LBL4. The memory cells may perform a write or read operation by current (or voltage) applied to the local word lines LWL1~LWL4 and/or the local bit lines LBL1~LBL4. In a data write operation on the memory blocks BLK1~BLK3 stacked in the 3D arrangement, data may be written using an in-place update or an out-of-place update through various detection and analysis operations, according to the above-described embodiments.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of operating a memory system including a plurality of memory chips having a plurality of resistive memory cells capable of an overwriting operation, the method comprising:
receiving one or more write requests, a logical address and data corresponding to the one or more write requests;
comparing a result of analyzing at least one of the received one or more write requests, the logical address, and the data with a threshold value; and
selecting a first update method or a second update method, based on a result of the comparing,
wherein when the first update method is selected, the data are written in a region indicated by a physical address corresponding to the logical address according to address mapping information,
wherein when the second update method is selected, information of the physical address corresponding to the logical address is changed, and the data are written in a region indicated by a changed physical address
wherein the comparing comprises comparing a number of the plurality of memory chips, with respect to which a write operation is requested by the logical address, with a first threshold value, or the comparing comprises determining a number of the one or more write requests allocated to each of the plurality of memory chips, and comparing a difference value between a number of write requests of a memory chip from among the plurality of memory chips to which a greatest number of write requests is allocated and a number of write requests of a memory chip from among the plurality of memory chips to which a least number of write requests is allocated, with a second threshold value.

2. The method of claim 1, wherein the one or more write requests are stored in a request queue of the memory system, and
wherein the comparing comprises comparing the number of the stored write requests with a third threshold value.

3. The method of claim 2, wherein when the number of the stored write requests is less than the third threshold value, the first update method is selected, and when the number of the stored write requests is equal to or greater than the third threshold value, the second update method is selected.

4. The method of claim 1, wherein the data corresponding to the one or more write requests is stored in a data queue of the memory system, and
wherein the comparing comprises comparing an amount of the stored data with a third threshold value.

5. The method of claim 1, wherein a plurality of write requests, logical addresses and data corresponding to the plurality of write requests are received, and
one of the first and second update methods is applied with respect to the plurality of write requests according to the result of the comparing.

6. The method of claim 1, wherein a plurality of write requests, logical addresses and data corresponding to the plurality of write requests are received, and
the first update method is applied with respect to a part of the plurality of write requests and the second update method is applied with respect to another part of the plurality of write requests according to the result of the comparing.

7. The method of claim 1, further comprising:
analyzing at least one of a wear-level, a bad block, and lifespan of cell regions provided in the memory system,
wherein the first update method or the second update method is selected with respect to the one or more write requests based on the result of the comparing and a result of the analyzing.

8. The method of claim 1, wherein the memory system further receives priority information regarding the one or more write requests and a tag indicating a characteristic of the data,
the method further comprising:
analyzing at least one of the received priority information and the tag, wherein the first update method or the second update method is selected with respect to the one or more write requests based on the result of the comparing and a result of the analyzing.

9. The method of claim 1, further comprising:
reading data of a region indicated by a physical address corresponding to the logical address; and
comparing bit values of the read data and the received data,
wherein the first update method or the second update method is selected with respect to the one or more write requests based on the result of the comparing and a result of the comparing of the bit values.

10. The method of claim 1, further comprising:
entering an idle state; and
performing various types of internal write operations in the idle state, wherein a part of internal write operations are performed using the first update method, and another part of the internal write operations are performed using the second update method.

11. A method of operating a memory system comprising a plurality of memory chips having a plurality of resistive memory cells capable of an overwriting operation, the method comprising:
receiving one or more write requests with corresponding data and first information from a host;
comparing a number of the plurality of memory chips, with respect to which a write operation is requested by received logical addresses, with a threshold value;
selecting an update method in response to the one or more write requests based on at least one of the first information received from the host, second information included in the memory system, and a result of the comparing; and
writing the received data in one of the plurality of memory chips or distributing and writing the data in at least two of the plurality of memory chips based on the selected update.

12. The method of claim 11,
wherein the first information comprises the logical addresses accompanied by the one or more write requests, and
wherein the update method is selected based on at least one of a number of the received one or more write requests, an amount of the data, and the number of the plurality of memory chips indicated by the logical addresses.

13. The method of claim 11, wherein the second information comprises at least one of information regarding a wear-level, a lifespan, and a bad block, and
wherein the update method is selected according to a result of analyzing the second information.

14. The method of claim 11,
wherein resistive memory cells of a first cell region indicated by a first logical address corresponding to a first write request from among the one or more write requests has a first resistance level distribution corresponding to previous data, and
wherein the writing comprises overwriting the previous data in the first cell region according to a result of the selecting.

15. The method of claim 11, wherein the resistive memory cells comprise a first cell region indicated by a first logical address corresponding to a first write request from among the one or more write requests and a second cell region comprising the resistive memory cells having an erase state, and
wherein the writing comprises changing the second cell region having the erase state to a resistance level distribution corresponding to the data according to a result of the selecting.

16. The method of claim 11, wherein the resistive memory cells comprise a first cell region indicated by a first logical address corresponding to a first write request from among the one or more write requests and a second cell region storing invalid data, and
wherein the writing comprises overwriting the invalid data in the second cell region according to a result of the selecting.

17. A memory system comprising:
a plurality of resistive memory devices comprising
a memory cell array capable of overwriting comprising a plurality of blocks and configured to store write data in one of a first region of the plurality of blocks corresponding to a logical address according to previously stored address mapping information or a second region of the plurality of blocks different from the first region; and
a memory controller comprising
a processing unit configured to control overall operations of the memory controller;
a host interface configured to receive a write request, the write data and the logical address from a host;
an update management unit configured to compare a number of memory chips, with respect to which a write operation is requested by the logical address, with a first threshold value and configured to select one of an in-place update operation or an out-of-place update operation in response to the write request from the host, the in-place update operation comprising overwriting data in the first region of the memory cell array with the write data, and the out-of-place update operation comprising writing at least a part of the write data in the second region of the memory cell array based on a comparison of a result of analyzing at least one of the write request, the logical address, and data with a second threshold value; and
a memory interface configured to output a first physical address to the memory device corresponding to the logical address when the in-place update operation is selected, the first physical address being in the first region, and to output a second physical address corresponding to the logical address when the out-of-place update operation is selected, at least a part of the second physical address being in the second region according to changed address mapping information.

* * * * *